United States Patent
Takayanagi et al.

(10) Patent No.: US 12,172,726 B2
(45) Date of Patent: Dec. 24, 2024

(54) NOTIFICATION DEVICE AND PROGRAM

(71) Applicant: Shimano Inc., Osaka (JP)

(72) Inventors: Toru Takayanagi, Osaka (JP);
Takahiro Kozaki, Osaka (JP); Minoru Omori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/395,143

(22) Filed: Dec. 22, 2023

(65) Prior Publication Data
US 2024/0239431 A1  Jul. 18, 2024

(30) Foreign Application Priority Data
Jan. 13, 2023  (JP) ................... 2023-003733

(51) Int. Cl.
*B62J 50/22* (2020.01)
*B62J 45/41* (2020.01)
*G06F 3/01* (2006.01)

(52) U.S. Cl.
CPC ............ *B62J 50/22* (2020.02); *B62J 45/41* (2020.02); *G06F 3/013* (2013.01)

(58) Field of Classification Search
CPC ............ G06F 3/013; B62J 50/22; B62J 45/41
See application file for complete search history.

(56) References Cited

U.S. PATENT DOCUMENTS

| | | | | |
|---|---|---|---|---|
| 10,442,486 B2* | 10/2019 | Nishino | ................. | B62M 6/40 |
| 10,527,722 B2* | 1/2020 | Carlson | ................. | B62J 50/225 |
| 10,647,381 B2* | 5/2020 | Durdevic | ................. | B62J 6/16 |
| 10,988,198 B2* | 4/2021 | Komatsu | ................. | B62K 25/10 |
| 11,008,066 B2* | 5/2021 | Nose | ................. | B62M 25/08 |
| 11,034,407 B2* | 6/2021 | Hara | ................. | B62J 6/01 |
| 11,046,392 B2* | 6/2021 | Shahana | ................. | B62J 45/4151 |
| 11,136,083 B2* | 10/2021 | Shirai | ................. | B62K 25/08 |
| 11,180,211 B2* | 11/2021 | Hara | ................. | B62J 43/30 |
| 11,203,388 B2* | 12/2021 | Komatsu | ................. | B62J 43/30 |
| 11,235,837 B2* | 2/2022 | Mioka | ................. | G01L 1/22 |
| 11,731,723 B2* | 8/2023 | Komemushi | ........ | B62M 25/08 |
| | | | | 701/22 |
| 11,794,854 B2* | 10/2023 | Tsukamoto | ............ | B62J 45/41 |
| 11,884,350 B2* | 1/2024 | Franke | ................. | G06V 20/58 |
| 12,037,074 B2* | 7/2024 | Sakagawa | ............ | B62K 25/28 |
| 12,049,170 B2* | 7/2024 | He | ................. | G06T 7/70 |
| 2016/0363665 A1 | 12/2016 | Carlson et al. | | |
| 2019/0152389 A1* | 5/2019 | Nakakura | ................. | B62J 3/00 |
| 2020/0010138 A1* | 1/2020 | Nishihara | ............. | B62J 43/20 |
| 2020/0409381 A1* | 12/2020 | Corbett | ................. | B62M 6/50 |
| 2021/0330042 A1* | 10/2021 | Degodoi | ................. | A43C 15/16 |

(Continued)

*Primary Examiner* — Vinh T Lam
(74) *Attorney, Agent, or Firm* — Global IP Counselors, LLP

(57) ABSTRACT

A notification device basically including a display and a controller. The display is configured to selectively display first information related to a traveling state of a first human-powered vehicle and second information related to a positional relationship between the first human-powered vehicle and a second human-powered vehicle that is different from the first human-powered. The controller is configured to control the display to display the second information in a case where the positional relationship between the first human-powered vehicle and the second human-powered vehicle satisfies a predetermined condition.

18 Claims, 12 Drawing Sheets

(56) References Cited

U.S. PATENT DOCUMENTS

| | | | |
|---|---|---|---|
| 2023/0148103 A1* | 5/2023 | Yuasa | B62J 50/22 280/288.4 |
| 2024/0169842 A1* | 5/2024 | Moriarty | B62J 50/22 |

* cited by examiner

NOTIFICATION DEVICE AND PROGRAM

CROSS-REFERENCE TO RELATED APPLICATIONS

This application claims priority to Japanese Patent Application No. 2023-003733, filed on Jan. 13, 2023. The entire disclosure of Japanese Patent Application No 2023-003733 is hereby incorporated herein by reference.

BACKGROUND

Technical Field

The present disclosure generally relates to a notification device and a program.

Background Information

One example of a notification device is disclosed in U.S. Patent Application Publication No. 2016/0363665 A1.

SUMMARY

An object of the present disclosure is to provide a notification device and a program that can suitably display a positional relationship between a plurality of human-powered vehicles.

In a notification device according to a first aspect of the present disclosure, the notification device basically includes a display and a controller. The display is configured to display first information related to a traveling state of a first human-powered vehicle and second information related to a positional relationship between the first human-powered vehicle and a second human-powered vehicle that is different from the first human-powered. The controller is configured to control the display to display the second information in a case where a positional relationship between the first human-powered vehicle and a second human-powered vehicle satisfies a predetermined condition.

With the notification device of the first aspect, the information related to the positional relationship between the first human-powered vehicle and the second human-powered vehicle can be displayed at a timing suitable for display. For example, in a case where the positional relationship between the first human-powered vehicle and the second human-powered vehicle does not satisfy the predetermined condition, the display does not display the second information. Therefore, the notification device can suitably display the positional relationship between the first human-powered vehicle and the second human-powered vehicle.

In the notification device of a second aspect according to the first aspect, the controller is further configured to control the display to display the second information in a case where the predetermined condition is satisfied while the first information is being displayed.

With the notification device of the second aspect, the display can display the positional relationship between the first human-powered vehicle and the second human-powered vehicle at a timing suitable for display while displaying a traveling state of the first human-powered vehicle. Therefore, the notification device can more suitably display the information related to the traveling state of the first human-powered vehicle and the information related to the positional relationship between the first human-powered vehicle and the second human-powered vehicle.

In the notification device of a third aspect according to the first or second aspect, the controller is further configured to control the display to display the second information in a case where a relative distance between the first human-powered vehicle and the second human-powered vehicle is equal to or more than a predetermined distance.

With the notification device of the third aspect, in a case where the distance between the first human-powered vehicle and the second human-powered vehicle is large, the display displays the information related to the positional relationship between the first human-powered vehicle and the second human-powered vehicle. Thus, the notification device can alert, for example, at least one of a rider of the first human-powered vehicle and a rider of the second human-powered vehicle that the distance between the first human-powered vehicle and the second human-powered vehicle is large.

In the notification device of a fourth aspect according to any one of the first to third aspects, the second information includes lost information indicating that the relative distance between the first human-powered vehicle and the second human-powered vehicle cannot be acquired.

The notification device of the fourth aspect can display the lost information to, for example, a rider.

In the notification device of a fifth aspect according to any one of the first to fourth aspects, the controller is further configured to control the display to switch between the first information and the second information based on an input related to a movement of the rider of the first human-powered vehicle.

With the notification device of the fifth aspect, the display can display information requested by the rider in accordance with the movement of the rider. Thus, the notification device can contribute to suitable traveling of the rider.

In the notification device of a sixth aspect according to the fifth aspect, the controller is further configured to control the display to switch between the first information and the second information based on an input from an operation unit operated by the rider.

With the notification device of the sixth aspect, the display can display information requested by the rider in accordance with the operation of the rider. Thus, the notification device can further contribute to suitable traveling of the rider.

In the notification device of a seventh aspect according to the fifth aspect, the controller is further configured to control the display to switch between the first information and the second information based on an input from a detection unit that detects a gaze change of the rider.

With the notification device of the seventh aspect, the rider can switch the display between the first information and the second information while maintaining his/her riding posture, for example. Thus, the notification device can enhance the safety of the rider.

In a notification device according to an eighth aspect of the present disclosure, the notification device includes a display and a controller. The display is configured to display information related to a positional relationship between a first human-powered vehicle and a second human-powered vehicle that is different from the first human-powered vehicle. The controller is configured to control the display to display first change information related to a manner of change in the positional relationship and second change information related to an amount of the change in the positional relationship.

With the notification device of the eighth aspect, the display can notify a rider of the manner of change in the positional relationship between the first human-powered vehicle and the second human-powered vehicle and of the amount of the change in the positional relationship. Thus, the notification device can suitably display the information related to the positional relationship between the first human-powered vehicle and the second human-powered vehicle. The notification device can contribute to suitable traveling of a rider.

In the notification device of a ninth aspect according to the eighth aspect, the first change information is displayed by using an arrow.

With the notification device of the ninth aspect, a rider can easily recognize a change in the positional relationship between the first human-powered vehicle and the second human-powered vehicle. For example, in a case where the distance between the first human-powered vehicle and the second human-powered vehicle changes, the rider can recognize a manner of the change in the distance between the first human-powered vehicle and the second human-powered vehicle by the orientation of the arrow. Thus, the notification device can further contribute to suitable traveling of the rider.

In the notification device of a tenth aspect according to the ninth aspect, the second change information includes at least one of a thickness of the arrow and a length of the arrow.

With the notification device of the tenth aspect, a rider can easily recognize an amount of change in the positional relationship between the first human-powered vehicle and the second human-powered vehicle. For example, in a case where the distance between the first human-powered vehicle and the second human-powered vehicle changes, the rider can recognize the amount of the change in the distance between the first human-powered vehicle and the second human-powered vehicle based on at least one of the thickness of the arrow and the length of the arrow. Thus, the notification device can further contribute to suitable traveling of the rider.

In the notification device of an eleventh aspect according to any one of the first to tenth aspects, the notification device is attachable to a human-powered vehicle.

The notification device of the eleventh aspect is attachable to different human-powered vehicles. The notification device can be easily maintained.

In the notification device of a twelfth aspect according to any one of the first to eleventh aspects, the information related to the positional relationship is displayed based on a timing at which the relative distance between the first human-powered vehicle and the second human-powered vehicle is measured.

The notification device of the twelfth aspect can accurately display the relative distance between the first human-powered vehicle and the second human-powered vehicle.

In the notification device of a thirteenth aspect according to any one of the first to twelfth aspects, the controller is further configured to control the display to display the information related to the positional relationship for a predetermined time interval, and then to end displaying of the information related to the positional relationship.

With the notification device of the thirteenth aspect, the display can shorten the long-time display of the positional relationship between the first human-powered vehicle and the second human-powered vehicle once measured. For example, in a case where the positional relationship between the first human-powered vehicle and the second human-powered vehicle changes after the positional relationship between the first human-powered vehicle and the second human-powered vehicle is displayed, the display can shorten the display of the positional relationship before the change.

Thus, the notification device can accurately display the positional relationship between the first human-powered vehicle and the second human-powered vehicle.

In the notification device of a fourteenth aspect according to any one of the first to thirteenth aspects, the notification device further includes a notification unit that executes notification of the information related to the positional relationship by using at least one of a sound and a vibration.

The notification device of the fourteenth aspect can further notify a rider of the information related to the positional relationship between the first human-powered vehicle and the second human-powered vehicle. For example, in a case where the positional relationship between the first human-powered vehicle and the second human-powered vehicle changes, the rider can recognize the change in the positional relationship at an early stage. Thus, the notification device can further contribute to suitable traveling of the rider.

In the notification device of a fifteenth aspect according to any one of the first to fourteenth aspects, the positional relationship is measured by using wireless communication between the first human-powered vehicle and the second human-powered vehicle.

The notification device of the fifteenth aspect can suitably display the information related to the positional relationship between the first human-powered vehicle and the second human-powered vehicle by direct communication between the first human-powered vehicle and the second human-powered vehicle. The notification device can reduce the cost.

In the notification device of a sixteenth aspect according to the fifteenth aspect, the wireless communication includes a Bluetooth-Low-Energy communication.

The notification device of the sixteenth aspect can reduce power consumption and suitably display the information related to the positional relationship between the first human-powered vehicle and the second human-powered vehicle.

With the notification device of a seventeenth aspect according to any one of the first to sixteenth aspects, the positional relationship is measured based on position information of the first human-powered vehicle and position information of the second human-powered vehicle.

The notification device of the seventeenth aspect can measure the positional relationship between the first human-powered vehicle and the second human-powered vehicle in a case where the distance between the first human-powered vehicle and the second human-powered vehicle is large. In a case where there is an obstacle between the first human-powered vehicle and the second human-powered vehicle, the notification device can measure the positional relationship between the first human-powered vehicle and the second human-powered vehicle.

In non-transitory computer-readable medium encoded with a program according to an eighteenth aspect of the present disclosure, the non-transitory computer-readable medium encoded with the program that is to be executed by a computer to function as the notification device according to any one of the first to seventeenth aspects.

With the program of the eighteenth aspect, the positional relationship between the first human-powered vehicle and the second human-powered vehicle can be suitably displayed.

With the notification device of the present disclosure, the positional relationship between the first human-powered vehicle and the second human-powered vehicle can be suitably displayed.

BRIEF DESCRIPTION OF THE DRAWINGS

Referring now to the attached drawings which form a part of this original disclosure, selected embodiments are illustrated.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
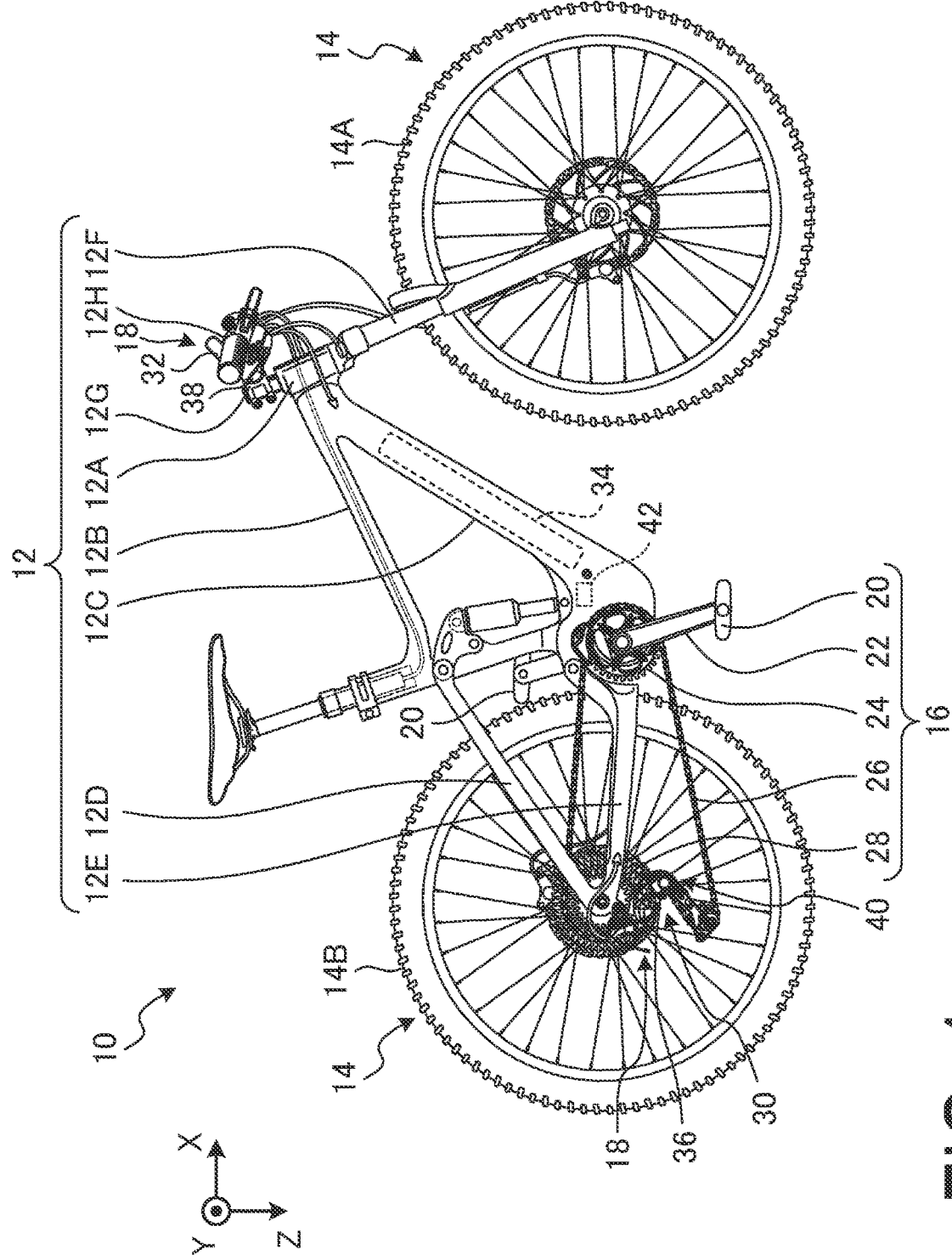
FIG. 1 is a side view of a human-powered vehicle mounted with a notification device according to a first embodiment.

A notification device 32 for a human-powered vehicle will be described with reference to FIGS. 1 to 9. A human-powered vehicle 10 is a vehicle that has at least one wheel and that can be driven by at least a human-powered driving force. As illustrated in FIG. 1, the human-powered vehicle 10 is, for example, a mountain bike. The human-powered vehicle 10 is not limited to the mountain bike and can be other types of bicycles as long as they can be driven by at least human-power, such as a road bike, a cross bike, a city bike, a cargo bike, a handcycle, and a recumbent bike. Examples of the human-powered vehicle 10 can include a monocycle and a vehicle having three or more wheels.

The human-powered vehicle 10 can include an electric drive unit. The electric drive unit is configured to assist the propulsion of the human-powered vehicle 10.

Hereinafter, the human-powered vehicle 10 can be described by using an orthogonal coordinate system including an X-axis, a Y-axis, and a Z-axis. The X-axis coincides with a front-rear direction of the human-powered vehicle 10. The Y-axis coincides with a left-right direction of the human-powered vehicle 10. The Z-axis coincides with an up-down direction of the human-powered vehicle 10. In this description, the following directional terms refer to the directions determined with reference to a rider facing a handlebar 12H at a reference position (e.g., on the saddle or seat) of the human-powered vehicle 10. The directional terms include "front", "rear", "forward", "backward", "left", "right", "lateral", "upper", "lower", and any other similar directional terms.

The human-powered vehicle 10 includes a frame 12. The frame 12 includes, for example, a head tube 12A, a top tube 12B, a down tube 12C, a seat stay 12D, and a chain stay 12E. The human-powered vehicle 10 includes a front fork 12F, a stem 12G, and the handlebar 12H. The front fork 12F and the stem 12G are coupled to the head tube 12A. The handlebar 12H is coupled to the stem 12G. The human-powered vehicle 10 includes a pair of wheels 14, a drive train 16, and a control target 18. The wheels 14 include a front wheel 14A and a rear wheel 14B. The front wheel 14A is coupled to the front fork 12F. The rear wheel 14B is coupled to a connecting portion of the seat stay 12D and the chain stay 12E.

The drive train 16 is configured to transmit a human-powered driving force to the rear wheel 14B. The drive train 16 includes a pair of pedals 20, a crank 22, a front chain wheel 24, a chain 26, and a rear sprocket 28. In a case where the crank 22 is rotated by the human-powered driving force applied to the pair of pedals 20, the front chain wheel 24 is rotated. The rotational force of the front chain wheel 24 is transmitted to the rear sprocket 28 via the chain 26. As the rear sprocket 28 rotates, the wheel 14 rotates. The rear sprocket 28 includes a plurality of sprockets. The rear sprocket 28 includes the plurality of sprockets having mutually different numbers of teeth.

The drive train 16 can include a pulley and a belt instead of the front chain wheel 24, the rear sprocket 28, and the chain 26. The drive train 16 can include a bevel gear and a shaft. The crank 22 includes a first crank arm coupled to a first end portion in an axial direction of a crankshaft, and a second crank arm coupled to a second end portion in the axial direction of the crankshaft. The drive train 16 can include another component such as a one-way clutch, another sprocket, or another chain. The front chain wheel 24 can include a plurality of chain wheels. Preferably, a rotation shaft of the front chain wheel 24 is disposed coaxially with the rotation shaft of the crank 22. A rotation shaft of the rear sprocket 28 is disposed coaxially with a rotation shaft of the rear wheel 14B.

The control target 18 includes a transmission device 30 and a notification device 32. In a case where the human-powered vehicle 10 includes an electric drive unit, the control target 18 includes the electric drive unit.

The transmission device 30 is provided to a transmission path of the human-powered driving force. The transmission path of the human-powered driving force is a path through which the human-powered driving force applied to the pedal 20 is transmitted to the wheel 14. The transmission device 30 includes an external transmission. The transmission device 30 includes, for example, a rear derailleur 36. The transmission device 30 can include a front derailleur. The transmission device 30 of the present embodiment includes the rear derailleur 36, the chain 26, and the rear sprocket 28. The transmission ratio of the transmission device 30 is changed by the rear derailleur 36 switching the rear sprocket 28 to mesh with the chain 26.

The transmission ratio is defined based on the relationship between the number of teeth of the front chain wheel 24 and the number of teeth of the rear sprocket 28. In one example, the transmission ratio is defined as the ratio of the number of teeth of the front chain wheel 24 to the number of teeth of the rear sprocket 28. Assuming that the transmission ratio is R, the number of teeth of the rear sprocket 28 is TR, and the number of teeth of the front chain wheel 24 is TF, the transmission ratio R is represented by an equation of R=TF/TR. The number of teeth of the rear sprocket 28 can be replaced with a rotational speed of the wheel 14, and the number of teeth TF of the front chain wheel 24 can be replaced with a rotational speed of the crank 22. In this case, the transmission ratio R is represented by the ratio of the rotational speed of the wheel 14 to the rotational speed of the crank 22. The transmission device 30 can include an internal transmission instead of the external transmission. The internal transmission is provided to a hub of the rear wheel 14B, for example. The transmission device 30 can include a continuously variable transmission instead of the external transmission. The continuously variable transmission is provided to the hub of the rear wheel 14B, for example.

The transmission device 30 is configured to change the transmission ratio in a manual transmission mode and an automatic transmission mode. The transmission mode is switched by a rider. The human-powered vehicle 10 can have any one of the manual transmission mode and the automatic transmission mode as the transmission mode.

In a case where the transmission mode is set to the manual transmission mode, the transmission device 30 is configured to be driven in response to operation of a transmission operation device 38, for example. The transmission device 30 includes an electric actuator 40. The transmission device 30 is operated by electric power supplied from a battery 34. The transmission device 30 can be supplied with electric power from a dedicated battery of the transmission device 30. In the present embodiment, the rear derailleur 36 is driven by the electric actuator 40. The electric actuator 40 is provided to the rear derailleur 36, for example. The electric actuator 40 can be connected to the rear derailleur 36 via a Bowden cable. The electric actuator 40 includes, for example, an electric motor and a reduction gear connected to the electric motor. In a case where the transmission mode is the automatic transmission mode, the transmission device 30 is configured to be driven in accordance with input information and a transmission condition of the human-powered vehicle 10.

The human-powered vehicle 10 includes a control device 42. The control device 42 is provided, for example, to the frame 12. The control device 42 can be housed in the down tube 12C. The control device 42 is operated by electric power supplied from the battery 34.

Figure 2:
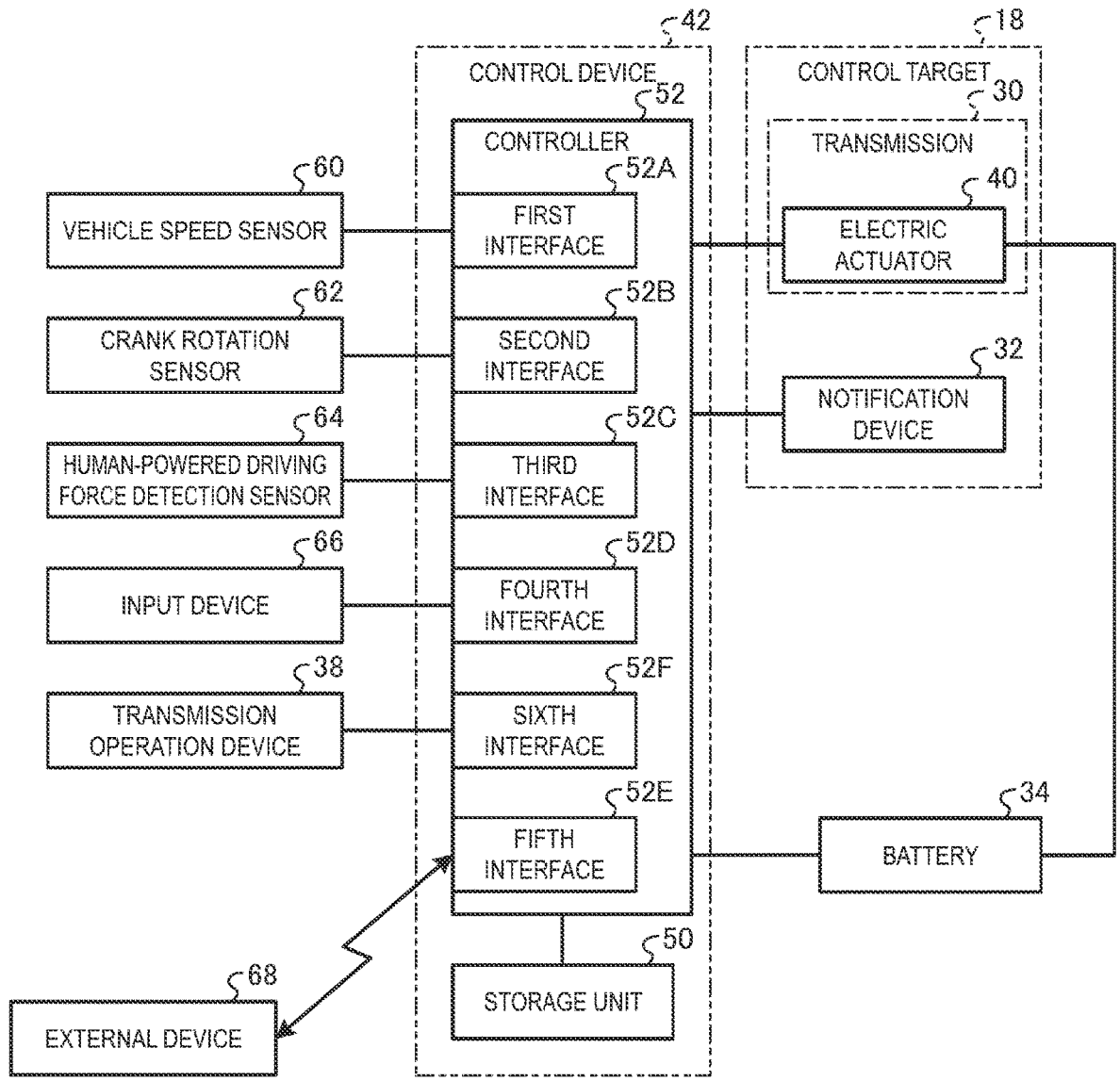
FIG. 2 is a block diagram illustrating an electrical configuration of a human-powered vehicle including the notification device according to the first embodiment.

As illustrated in FIG. 2, the control device 42 includes a storage unit 50 and a controller 52. The storage unit 50 includes, for example, storage devices such as a nonvolatile memory and a volatile memory. The nonvolatile memory includes, for example, at least one of a Read Only Memory (ROM), a flash memory, and a hard disk. The volatile memory includes, for example, a Random Access Memory (RAM). The storage unit 50 stores programs used for control by the controller 52. The storage unit 50 includes any computer storage device or any non-transitory computer-readable medium with the sole exception of a transitory, propagating signal. The storage unit 50 can also be referred to as a computer storage device or a memory device. Thus, the storage unit 50 does not include a human being.

The controller 52 is formed of one or more semiconductor chips that are mounted on a circuit board. The controller 52 can also be referred to as an electronic controller. Thus, the terms "electronic controller" as used herein refer to hardware that executes a software program, and does not include a human being. The controller 52 includes, for example, an arithmetic device such as a Central Processing Unit (CPU) or a Micro Processing Unit (MPU). The controller 52 can include a plurality of arithmetic devices. The plurality of arithmetic devices can be provided to positions separated from each other. The controller 52 is configured to comprehensively control at least one movement of the control target 18, for example, by the arithmetic device executing a program stored in the ROM while using the RAM as a work area.

The controller 52 is connected to a vehicle speed sensor 60, a crank rotation sensor 62, a human-powered driving force detection sensor 64, an input device 66, the transmission operation device 38, the electric actuator 40, and the notification device 32 via at least one of an electric cable and a wireless communication device. Thus, the term "sensor" as used herein do not include a human being. The controller 52 is connected to an external device 68 via at least one of an electric cable and a wireless communication device. The controller 52 need not be connected to the external device 68. The controller 52 is connected to the battery 34 via an electric cable.

Preferably, the controller 52 includes a first interface 52A. The first interface 52A is configured to input information detected by the vehicle speed sensor 60. Preferably, the controller 52 includes a second interface 52B. The second interface 52B is configured to input information detected by the crank rotation sensor 62. Preferably, the controller 52 includes a third interface 52C. The third interface 52C is configured to input information detected by the human-powered driving force detection sensor 64. Preferably, the controller 52 includes a fourth interface 52D. The fourth interface 52D is configured to input information received by the input device 66. Preferably, the controller 52 includes a fifth interface 52E. The fifth interface 52E is configured to input information transmitted from the external device 68. Preferably, the controller 52 includes a sixth interface 52F. The sixth interface 52F is configured to input information transmitted from the transmission operation device 38.

The first interface 52A to the sixth interface 52F each include, for example, at least one of a cable connection port and a wireless communication device. The wireless communication device includes, for example, a short-range wireless communication unit. The short-range wireless communication unit is configured to perform wireless communication based on wireless communication standards such as Bluetooth (trade name), Bluetooth-Low-Energy (BLE), and ANT+.

An electric cable to be connected to the vehicle speed sensor 60 can be fixed to the first interface 52A. An electric cable to be connected to the crank rotation sensor 62 can be fixed to the second interface 52B. An electric cable to be connected to the human-powered driving force detection sensor 64 can be fixed to the third interface 52C. An electric cable to be connected to the input device 66 can be fixed to the fourth interface 52D. The fifth interface 52E includes, for example, a wireless communication device. An electric cable to be connected to the transmission operation device 38 can be connected to the sixth interface 52F.

The vehicle speed sensor 60 is configured to output information related to the speed of the human-powered vehicle 10 to the controller 52. The vehicle speed sensor 60 is configured to output a signal corresponding to the rotational speed of the wheel 14. The vehicle speed sensor 60 is provided to the chain stay 12E of the human-powered vehicle 10, for example. The vehicle speed sensor 60 includes a magnetic sensor. The vehicle speed sensor 60 is configured to detect a magnetic field of one or more magnets mounted on a spoke, a disc brake rotor, or the hub of the wheel 14.

The vehicle speed sensor 60 is configured to output a signal in a case where the magnetic field is detected. The controller 52 is configured to calculate the traveling speed of the human-powered vehicle 10 based on, for example, a time interval or a signal width of a signal output from the vehicle speed sensor 60 accompanying the rotation of the wheel 14 and information related to the circumferential length of the wheel 14. The vehicle speed sensor 60 can have any configuration as long as it is configured to output information related to the speed of the human-powered vehicle 10. The vehicle speed sensor 60 can include not only the magnetic sensor but also another sensor such as an optical sensor, an acceleration sensor, or a GPS receiver.

The crank rotation sensor 62 is configured to output information corresponding to a rotation state of the crank 22 to the controller 52. The crank rotation sensor 62 is configured to detect information corresponding to the rotational speed of the crank 22, for example. The crank rotation sensor 62 is configured to detect, for example, a top dead center of the pedal 20 of the human-powered vehicle 10 and a bottom dead center of the pedal 20 of the human-powered vehicle 10. The crank rotation sensor 62 is configured to include, for example, a magnetic sensor that outputs a signal corresponding to the strength of the magnetic field. An annular magnet whose magnetic field strength changes in the circumferential direction is provided to a member that rotates in conjunction with the rotation shaft of the crank 22 or to a power transmission path extending from the rotation shaft of the crank 22 to the front chain wheel 24. For example, the crank rotation sensor 62 is provided in such a manner that the strength of the magnetic field is maximized at the top dead center of the pedal 20 and at the bottom dead center of the pedal 20.

For example, in a case where a one-way clutch is not provided between the rotation shaft of the crank 22 and the front chain wheel 24, the annular magnet can be provided to the front chain wheel 24. The crank rotation sensor 62 can have any configuration as long as it is configured to output information corresponding to the rotation state of the crank 22, and can include an optical sensor, an acceleration sensor, a gyro sensor, a torque sensor, or the like instead of the magnetic sensor.

The human-powered driving force detection sensor 64 is configured to output information related to the human-powered driving force to the controller 52. The human-powered driving force detection sensor 64 is configured to output a signal corresponding to the human-powered driving force applied to the crank 22, for example. The human-powered driving force detection sensor 64 is provided to a transmission path of the human-powered driving force extending from the rotation shaft of the crank 22 to the front chain wheel 24. The human-powered driving force detection sensor 64 can be provided to the rotation shaft of the crank 22 or the front chain wheel 24. The human-powered driving force detection sensor 64 can be provided to the crank 22 or the pedal 20. The human-powered driving force detection sensor 64 can be achieved by using, for example, a strain sensor, a magnetostrictive sensor, an optical sensor, a pressure sensor, or the like. The human-powered driving force detection sensor 64 can be any sensor that outputs a signal corresponding to the human-powered driving force applied to the crank 22 or the pedal 20.

The input device 66 is a device that can change the setting of the human-powered vehicle 10. The input device 66 is configured to output, to the controller 52, the information that is input. The input device 66 outputs a signal for switching the transmission mode to the controller 52, in response to a user's operation, for example. The user includes a rider. The input device 66 can be removably provided to the human-powered vehicle 10. The input device 66 can include a smartphone. The input device 66 can include a cycle computer.

The transmission operation device 38 includes an operation switch to be operated with the user's finger or the like. Preferably, the transmission operation device 38 includes an up-shift operation switch and a down-shift operation switch. The transmission operation device 38 is preferably provided to the handlebar 12H.

The external device 68 is, for example, a device that can change at least one of the setting of the human-powered vehicle 10 and the setting of the notification device 32, from the outside. The external device 68 includes at least one of a smart device and a personal computer. The smart device includes at least one of a wearable device such as a smart watch, a smartphone, and a tablet computer.

The notification device 32 is mountable on the human-powered vehicle 10. For example, the notification device 32 is mounted on the handlebar 12H of the human-powered vehicle 10. The notification device 32 can be mounted on the stem 12G. The notification device 32 operates with electric power of an internal battery provided to the interior thereof. The notification device 32 can be configured to operate with electric power supplied from the battery 34. The notification device 32 includes, for example, a cycle computer. The notification device 32 can include a smartphone.

Figure 3:
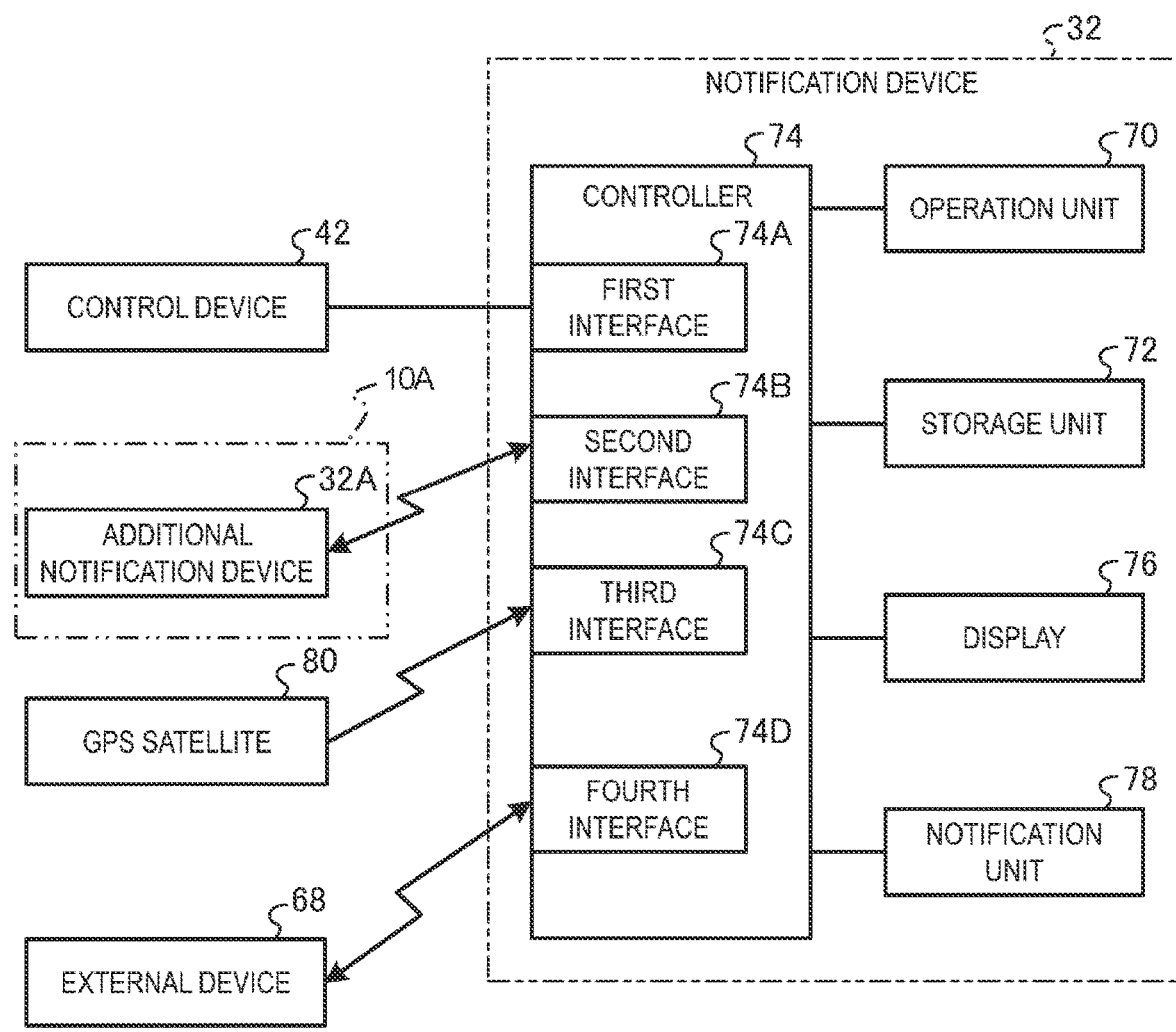
FIG. 3 is a block diagram illustrating an electrical configuration of the notification device according to the first embodiment.

As illustrated in FIG. 3, the notification device 32 includes an operation unit 70, a storage unit 72, a controller 74, a display 76, and a notification unit 78. The operation unit 70 receives operation of a rider for the notification device 32. The operation unit 70 can receive operation of a user different from the rider. The operation unit 70 includes buttons. At least part of the operation unit 70 can be provided integrally with the display 76. The operation unit 70 includes, for example, a touch panel.

The storage unit 72 includes, for example, storage devices such as a nonvolatile memory and a volatile memory. The storage unit 72 stores programs used for control by the controller 74. The storage unit 72 stores, for example, map information. The storage unit 72 includes any computer storage device or any non-transitory computer-readable medium with the sole exception of a transitory, propagating signal. The storage unit 72 can also be referred to as a computer storage device or a memory device. Thus, the storage unit 72 does not include a human being.

The controller 74 is formed of one or more semiconductor chips that are mounted on a circuit board. The controller 74 can also be referred to as an electronic controller. The controller 74 includes an arithmetic device such as a CPU or an MPU. The controller 74 can include a plurality of arithmetic devices. The plurality of arithmetic devices can be provided to positions separated from each other. The controller 74 is configured to comprehensively control the overall operation of the notification device 32, for example, by the arithmetic device executing a program stored in a ROM while using a RAM as a work area. For example, the program is configured to allow a computer to function as the notification device 32.

The controller 74 is connected to the control device 42 via at least one of an electric cable and a wireless communication device. The controller 74 is connected to an additional notification device 32A via a wireless communication device. The controller 74 is configured to wirelessly communicate with the additional notification device 32A based on wireless communication standards such as BLE, for example. The additional notification device 32A is mounted on a human-powered vehicle different from the human-powered vehicle 10 on which the notification device 32 is mounted. Hereinafter, the human-powered vehicle 10 on which the notification device 32 is mounted will be described as a "first human-powered vehicle 10". As diagrammatically illustrated in FIG. 3, a human-powered vehicle 10A on which the additional notification device 32A is mounted is described as a "second human-powered vehicle". A plurality of second human-powered vehicles 10A can be present. That is, a plurality of additional notification devices 32A can be present. The number of second human-powered vehicles 10A can be one. The number of additional notification devices 32A can be one. The controller 74 is connected to a Global Positioning System (GPS) satellite 80 via satellite communication. The first human-powered vehicle 10 and the second human-powered vehicle 10A are included in human-powered vehicles traveling in a group ride.

Preferably, the controller 74 includes a first interface 74A. The first interface 74A is configured to receive information transmitted from the control device 42. The information transmitted from the control device 42 includes at least one of the speed of the first human-powered vehicle 10, the rotation state of the crank 22, and the human-powered driving force. Preferably, the controller 74 includes a second interface 74B. The second interface 74B is configured to receive information transmitted from the additional notification device 32A. The second interface 74B is configured to receive information related to the distance from the additional notification device 32A. The information related to the distance is information related to a relative distance between the first human-powered vehicle 10 and the second human-powered vehicle 10A. The information related to the distance includes information related to a relative distance between the notification device 32 and the additional notification device 32A. For example, the information related to the distance includes information related to the strength of a radio signal (RSSI value) emitted by the additional notification device 32A. The second interface 74B is configured to receive the radio signal emitted by the additional notification device 32A. Preferably, the controller 74 includes a third interface 74C. The third interface 74C is configured to receive information related to the position of the notification device 32 from the GPS satellite 80. Preferably, the controller 74 includes a fourth interface 74D. The fourth interface 74D is configured to receive information transmitted from the external device 68.

The first interface 74A includes, for example, at least one of a cable connection port and a wireless communication device. An electric cable to be connected to the control device 42 can be fixed to the first interface 74A. The second interface 74B includes a wireless communication device. The second interface 74B is configured to perform wireless communication with the additional notification device 32A. The wireless communication includes, for example, the BLE communication. The third interface 74C includes a satellite communication device. The third interface 74C is, for example, a GPS receiver. The fourth interface 74D includes, for example, a wireless communication device.

The controller 74 sets a privilege. The controller 74 sets the privilege based on the operation of the operation unit 70. The term "privilege" as used herein refers to a privilege to display information related to the positional relationship between the plurality of human-powered vehicles 10 and 10A. The privilege is associated with the rider of the first human-powered vehicle 10. The rider of the first human-powered vehicle 10 is a rider to play a predetermined role. For example, in a case where a plurality of riders drive the human-powered vehicles in a group ride, the privilege is associated with the rider playing the predetermined role. For example, in a case where the riders in the group ride include a leader and general members, a rider playing the predetermined role is the leader. For example, in a case where the riders in the group ride include a guide staff and participants, a rider playing the predetermined role is the guide staff. For example, in a case where the riders in the group ride include an ace and assists, a rider playing the predetermined role is the ace. The privilege can be associated with a rider other than the rider playing the predetermined role. The privilege can also be associated with a rider other than the rider playing the predetermined role. The setting result of the privilege is stored in the storage unit 72.

The information of the human-powered vehicles to be driven in the group ride is set in advance. For example, pairing is performed by the plurality of notification devices. By performing the pairing, the information of the human-powered vehicles to be driven in the group ride is set.

The display 76 includes a display panel. The display panel is, for example, a liquid crystal display panel or an organic Electro Luminescence (EL) display panel. The display 76 can include a touch panel. The display 76 can display information related to the positional relationship between the plurality of human-powered vehicles. For example, the display 76 can display information related to the positional relationship between the first human-powered vehicle 10 and the second human-powered vehicle 10A.

The notification unit 78 includes a speaker. The notification unit 78 includes a vibration generation device. The vibration generation device includes a motor.

Figure 4:
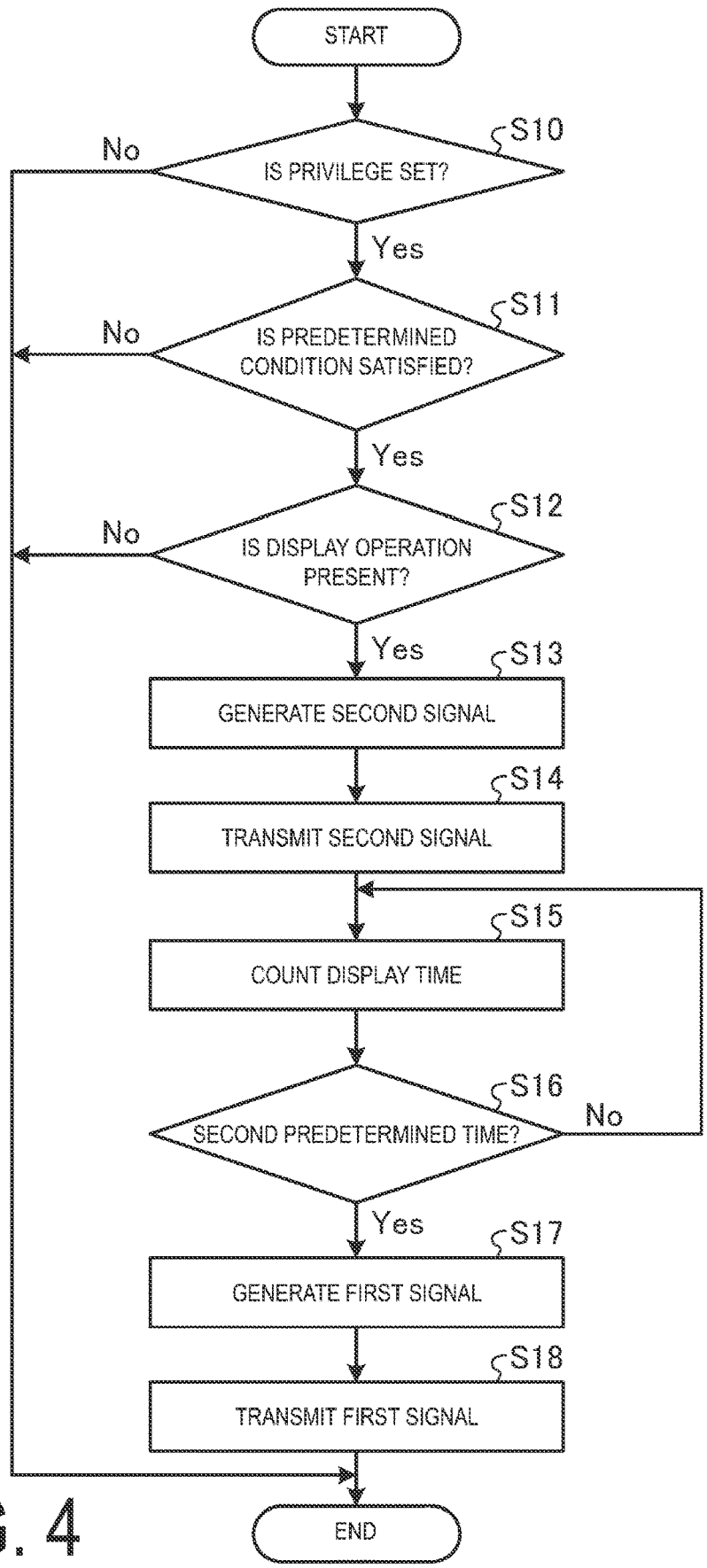
FIG. 4 is a flowchart illustrating an example of a control flow for controlling display of a display in a notification device according to the first embodiment.

The controller 74 displays first information or second information on the display 76 by executing a control flow illustrated in FIG. 4. The controller 74 performs switching between the first information and the second information being displayed on the display 76 based on the input related to the movement of the rider of the first human-powered vehicle 10. For example, the controller 74 performs switching between the first information and the second information being displayed on the display 76 based on the input from the operation unit 70 to be operated by the rider.

The first information includes information related to the traveling state of the first human-powered vehicle 10. The traveling state of the first human-powered vehicle 10 includes at least one of the speed of the first human-powered vehicle 10, the rotation state of the crank 22, and the human-powered driving force. The traveling state of the first human-powered vehicle 10 can include a position of the first human-powered vehicle 10 on a map.

The second information is information different from the first information. The second information includes information related to the positional relationship between the plurality of human-powered vehicles. The second information includes information related to the positional relationship between the first human-powered vehicle 10 and the second human-powered vehicle 10A. The second information includes information related to a position of each of the one or more second human-powered vehicles 10A relative to the first human-powered vehicle 10. The positional relationship between the first human-powered vehicle 10 and the second human-powered vehicle 10A includes a relative distance between the first human-powered vehicle 10 and the second human-powered vehicle 10A. The second information can include information related to the positional relationship between the plurality of second human-powered vehicles 10A. The positional relationship between the plurality of second human-powered vehicles 10A includes a relative distance between the plurality of second human-powered vehicles 10A.

The positional relationship between the plurality of human-powered vehicles is measured by using wireless communication between the plurality of human-powered vehicles. The positional relationship between the first human-powered vehicle 10 and the second human-powered vehicle 10A is measured by using wireless communication between the first human-powered vehicle 10 and the second human-powered vehicle 10A. For example, the controller 74 measures the relative distance between the first human-powered vehicle 10 and the second human-powered vehicle 10A based on the radio signal strength. The radio signal strength is the strength of the radio signal emitted by the additional notification device 32A. In a case where a predetermined interval has elapsed, the controller 74 measures the relative distance between the first human-powered vehicle 10 and the second human-powered vehicle 10A. Every time the predetermined interval has elapsed, the controller 74 measures the relative distance between the first human-powered vehicle 10 and the second human-powered vehicle 10A. The predetermined interval is set in advance. The predetermined interval can be set via the operation unit 70. The relative distance between the first human-powered vehicle 10 and the second human-powered vehicle 10A is shorter as the radio signal strength is greater. In a case where the plurality of second human-powered vehicles 10A are present, the controller 74 measures the relative distance between the first human-powered vehicle 10 and each of the second human-powered vehicles 10A.

After completing the measurement of the relative distance between the first human-powered vehicle 10 and the second human-powered vehicle 10A, the controller 74 executes the control flow illustrated in FIG. 4. Completion of the measurement of the relative distance is a trigger for starting the execution of the control flow illustrated in FIG. 4. In a case where the plurality of second human-powered vehicles 10A are present, the controller 74 measures the relative distance between the first human-powered vehicle 10 and each of the second human-powered vehicles 10A. In the case where the plurality of second human-powered vehicles 10A are present, after the completion of the measurement of the relative distance between the first human-powered vehicle 10 and each of the second human-powered vehicles 10A, the controller 74 executes the control flow illustrated in FIG. 4. In a case where the measurement of the relative distance between the first human-powered vehicle 10 and the second human-powered vehicle 10A is completed, the notification unit 78 can notify that the measurement of the relative distance between the first human-powered vehicle 10 and the second human-powered vehicle 10A is completed. For example, the notification unit 78 notifies the completion of the measurement of the relative distance between the first human-powered vehicle 10 and the second human-powered vehicle 10A by using at least one of a sound and a vibration.

In a case where the control flow illustrated in FIG. 4 has not been executed, the controller 74 generates a first signal. The first signal is a signal for displaying a first image. The first image is an image including the first information. The controller 74 transmits the first signal to the display 76. With this, the first image is displayed on the display 76. The display 76 displays the first information.

In a case where the radio signal strength is equal to or greater than predetermined strength, the controller 74 can measure the relative distance between the first human-powered vehicle 10 and the second human-powered vehicle 10A. The predetermined strength is set in advance. For example, in a case where at least one of a plurality of pieces of the radio signal strength is equal to or greater than the predetermined strength, the controller 74 measures the relative distance between the first human-powered vehicle 10 and the second human-powered vehicle 10A.

In step S10, the controller 74 determines whether the privilege is set. The controller 74 reads out the privilege setting result stored in the storage unit 72. The controller 74 determines whether the privilege is set based on the read setting result. In a case where it is determined that the privilege is not set, the controller 74 ends the current control flow. In the case where the privilege is not set, the display 76 continues to display the first image. In the case where the privilege is not set, the display 76 does not display the second information. In the present embodiment, an example is described in which the second information is displayed on the display 76 in the case where the privilege is set, and the second information is not displayed on the display 76 in the case where the privilege is not set, but the present disclosure is not limited thereto. Alternatively, for example, in the case where the privilege is not set, the second information may be displayed on the display 76. It is sufficient that the second information is notified to at least one of the human-powered vehicle to which the privilege is set and the rider associated with the privilege.

In a case where it is determined in step S10 that the privilege is set, the controller 74 proceeds to step S11. In step S11, the controller 74 determines whether a predetermined condition is satisfied. The predetermined condition is a condition related to the positional relationship between the first human-powered vehicle 10 and the second human-powered vehicle 10A. In a case where the relative distance between the first human-powered vehicle 10 and the second human-powered vehicle 10A is greater than or equal to a first predetermined distance, the controller 74 determines that the predetermined condition is satisfied. In a case where the relative distance between the first human-powered vehicle 10 and the second human-powered vehicle 10A is less than the first predetermined distance, the controller 74 determines that the predetermined condition is not satisfied. The first predetermined distance is set in advance. The first predetermined distance is, for example, 10 m. The first predetermined distance can be set via the operation unit 70, for example. The first predetermined distance is stored in the storage unit 72. In a case where the plurality of second human-powered vehicles 10A are present and at least one of the relative distances between the first human-powered vehicle 10 and the respective second human-powered vehicles 10A is greater than or equal to the first predetermined distance, the controller 74 determines that the predetermined condition is satisfied. In a case where the plurality of second human-powered vehicles 10A are present and all of the relative distances between the first human-powered vehicle 10 and the respective second human-powered vehicles 10A are less than the first predetermined distance, the controller 74 determines that the predetermined condition is not satisfied. In a case where it is determined in step S11 that the predetermined condition is not satisfied, the controller 74 ends the current control flow. In a case where it is determined in step S11 that the predetermined condition is satisfied, the controller 74 proceeds to step S12.

In step S12, the controller 74 determines whether there is a display operation of a second image. The second image includes the second information. The controller 74 determines whether the display operation of the second image has been performed based on the operation of the operation unit 70. For example, in a case where a rider has performed a display operation of the second image with the operation unit 70, the controller 74 determines that the display operation of the second image is present. In a case where the rider has not performed the display operation of the second image with the operation unit 70, the controller 74 determines that the display operation of the second image is not present. In a case where it is determined that the display operation of the second image is not present, the controller 74 ends the current control flow. In a case where it is determined that the display operation of the second image is present, the controller 74 proceeds to step S13.

In step S13, the controller 74 generates a second signal. The second signal is a signal for displaying the second image. The controller 74, after generating the second signal in step S13, proceeds to step S14.

In step S14, the controller 74 transmits the second signal to the display 76. Thus, the second image is displayed on the display 76. The second image is displayed on the display 76 instead of the first image. The image displayed on the display 76 is switched from the first image to the second image. The display 76 displays the second information. In a case where the positional relationship between the first human-powered vehicle 10 and the second human-powered vehicle 10A satisfies the predetermined condition and the display operation of the second image is present, the display 76 displays the second information. The switching from the first image to the second image can be notified by the notification unit 78. In a case where the image displayed on the display 76 is switched from the first image to the second image, the notification unit 78 notifies the rider of the switching from the first image to the second image, by using at least one of a sound and a vibration, for example.

Figure 5:
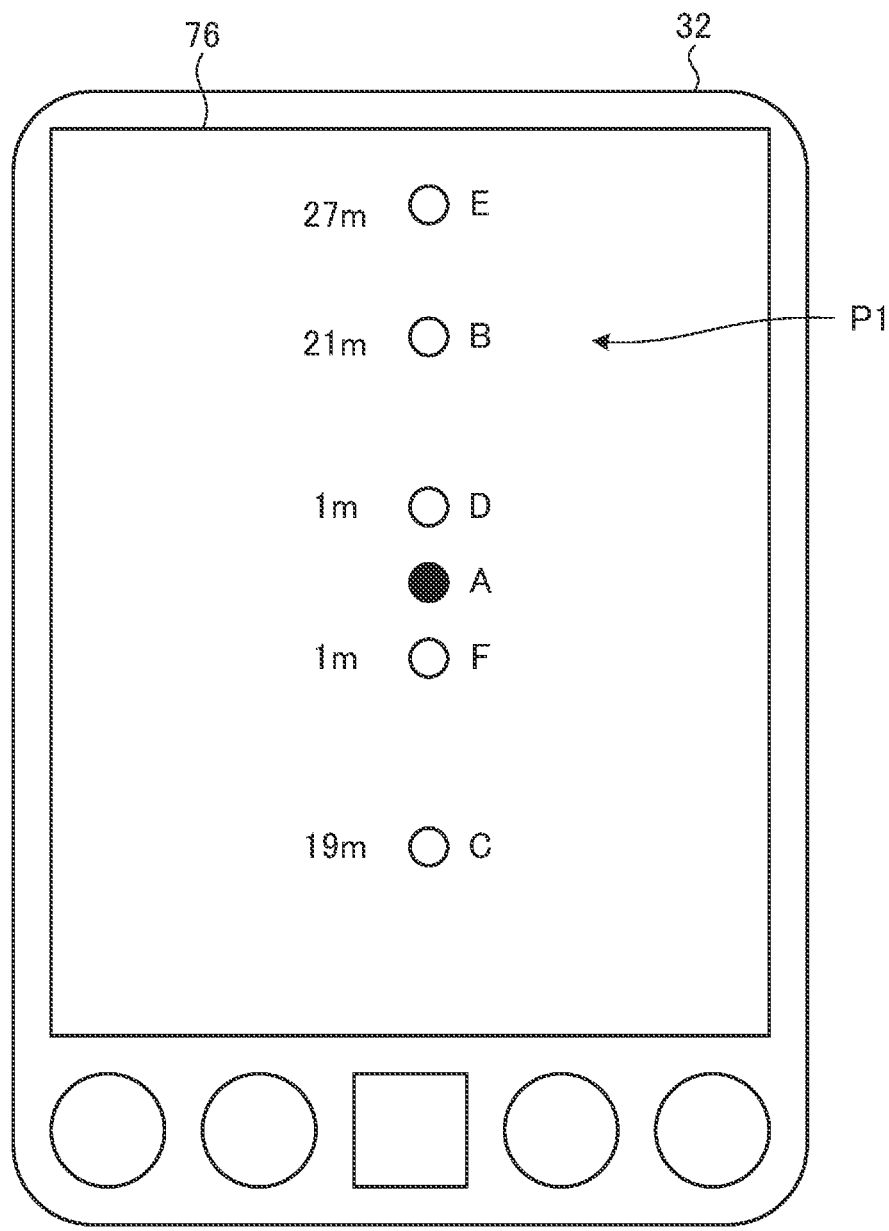
FIG. 5 is a diagram illustrating an example of display in the notification device according to the first embodiment.
Figure 6:
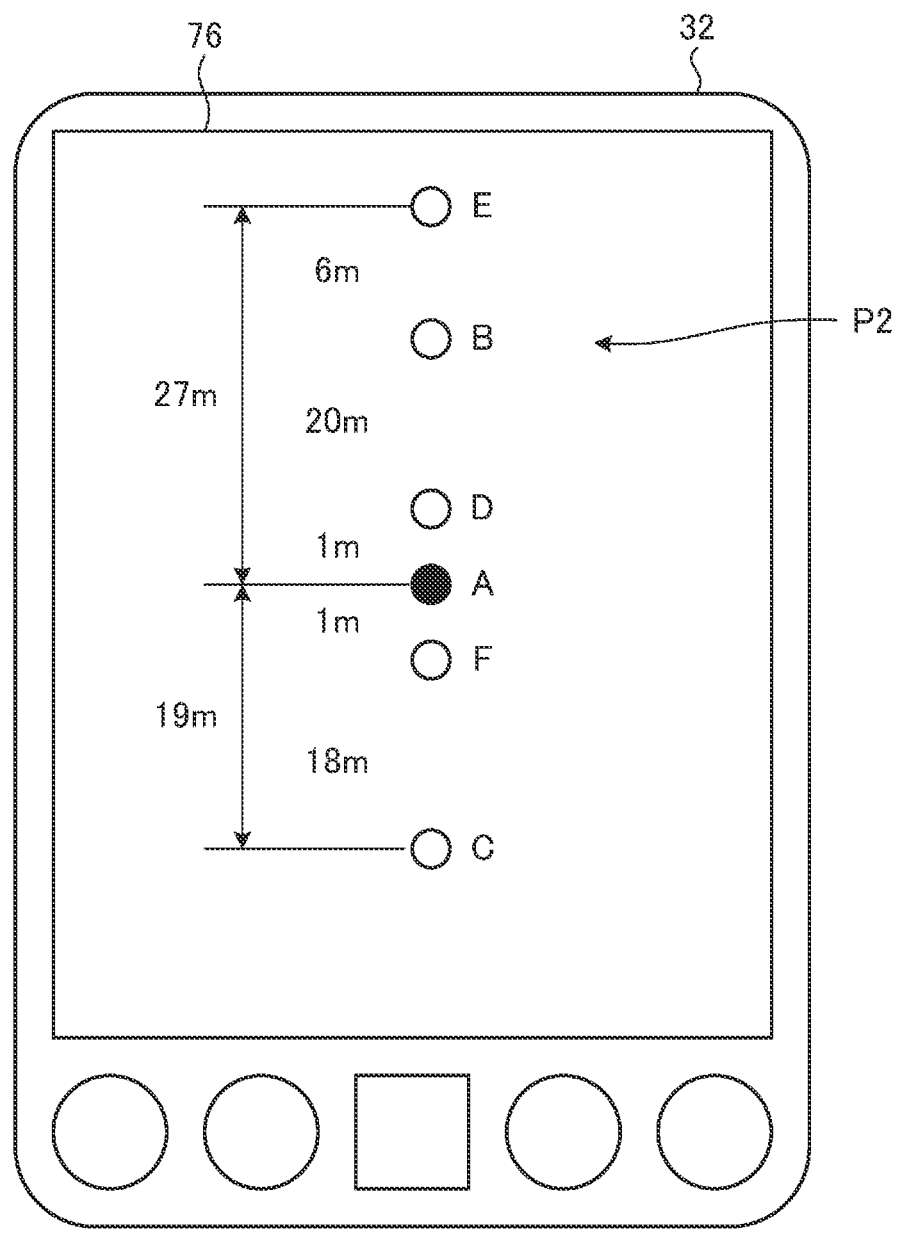
FIG. 6 is a diagram illustrating a modified example of display in the notification device according to the first embodiment.
Figure 7:
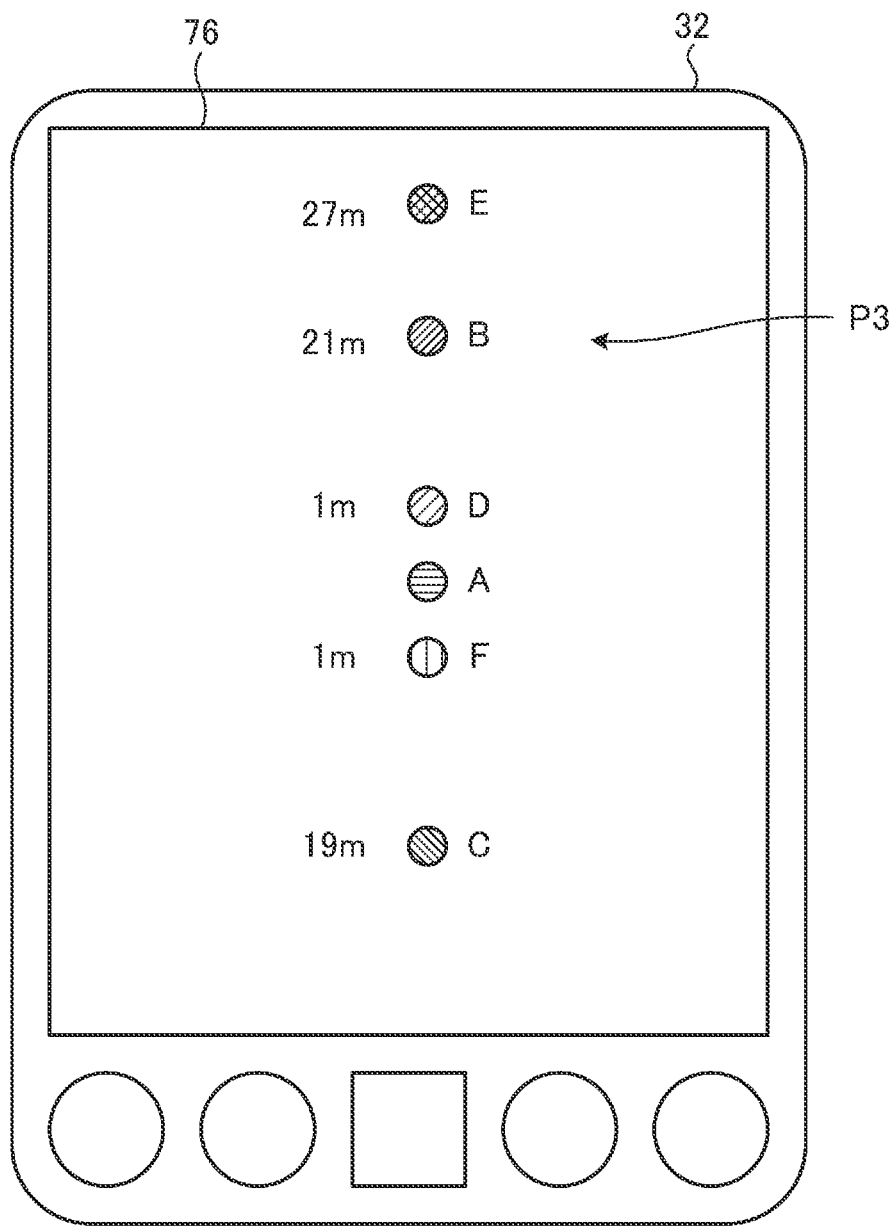
FIG. 7 is a diagram illustrating a modified example of display in the notification device according to the first embodiment.

For example, in a case where six human-powered vehicles are driven in a group ride, the display 76 displays a second image P1 illustrated in FIG. 5. Of the six human-powered vehicles, three second human-powered vehicles 10A travel in front of the first human-powered vehicle 10, and two second human-powered vehicles 10A travel behind the first human-powered vehicle 10. Hereinafter, second images P2 to P5 illustrated in FIGS. 6 to 9 are also examples of the images for the six human-powered vehicles traveling in the group ride. In the second image P1, the first human-powered vehicle 10 and each of the second human-powered vehicles 10A are displayed by different types of icons. For example, the first human-powered vehicle 10 and each of the second human-powered vehicles 10A are displayed by icons of different colors. In the second image P1, the name of each human-powered vehicle is displayed. The name of each human-powered vehicle is associated with each of the notification devices 32 and 32A to be mounted on each of the human-powered vehicles. The name of each human-powered vehicle is a name for distinguishing each human-powered vehicle. The name of each human-powered vehicle includes a symbol and an abbreviation. The name of each human-powered vehicle can be set by operation of the operation unit 70, for example. In the second image P1, the first human-powered vehicle 10 is indicated by the name "A". In the second image, the second human-powered vehicles 10A are respectively indicated by the names "B" to "F".

For example, the second human-powered vehicle 10A of "D", the second human-powered vehicle 10A of "B", and the second human-powered vehicle 10A of "E" are traveling in front of the first human-powered vehicle 10 of "A". The relative distance between the first human-powered vehicle 10 of "A" and the second human-powered vehicle 10A of "D" is "1 m". The relative distance between the first human-powered vehicle 10 of "A" and the second human-powered vehicle 10A of "B" is "21 m". The relative distance between the first human-powered vehicle 10 of "A" and the second human-powered vehicle 10A of "E" is "27 m". The second human-powered vehicle 10A of "F" and the second human-powered vehicle 10A of "C" are traveling behind the first human-powered vehicle 10 of "A". The relative distance between the first human-powered vehicle 10 of "A" and the second human-powered vehicle 10A of "F" is "1 m". The relative distance between the first human-powered vehicle 10 of "A" and the second human-powered vehicle 10A of "C" is "19 m". In the second image P1, the relative distance of each second human-powered vehicle 10A to the first human-powered vehicle 10 is displayed.

The display 76 can display the relative distances between the respective human-powered vehicles aligned in a traveling direction. The relative distances between the respective human-powered vehicles are each measured by the controller 74 based on the relative distance between the first human-powered vehicle 10 and each of the second human-powered vehicles 10A. For example, in a case where the second human-powered vehicle 10A of "E", the second human-powered vehicle 10A of "B", the second human-powered vehicle 10A of "D", the first human-powered vehicle 10 of "A", the second human-powered vehicle 10A of "F", and the second human-powered vehicle 10A of "C" are aligned from the front side in the traveling direction, the display 76 displays the second image P2 illustrated in FIG. 6. For example, the relative distance between the second human-powered vehicle 10A of "E" and the second human-powered vehicle 10A of "B" is "6 m". The relative distance between the second human-powered vehicle 10A of "B" and the second human-powered vehicle 10A of "D" is "20 m". The relative distance between the second human-powered vehicle 10A of "D" and the first human-powered vehicle 10 of "A" is "1 m". The relative distance between the first human-powered vehicle 10 of "A" and the second human-powered vehicle 10A of "F" is "1 m". The relative distance between the second human-powered vehicle 10A of "F" and the second human-powered vehicle 10A of "C" is "18 m". Each relative distance is displayed in the second image P2. The display 76 can further display the relative distance between the first human-powered vehicle 10 and the second human-powered vehicle 10A traveling at the head. The display 76 can display the relative distance between the first human-powered vehicle 10 and the second human-powered vehicle 10A traveling at the tail end. For example, in the second image P2 illustrated in FIG. 6, the second human-powered vehicle 10A of "E" is traveling at the head, and the relative distance between the first human-powered vehicle 10 of "A" and the second human-powered vehicle 10A of "E" is "27 m". In the second image P2 illustrated in FIG. 6, the second human-powered vehicle 10A of "C" is traveling at the tail end, and the relative distance between the first human-powered vehicle 10 of "A" and the second human-powered vehicle 10A of "C" is "19 m". For example, in the second image P2 illustrated in FIG. 6, the relative distance between the first human-powered vehicle 10 of "A" and the second human-powered vehicle 10A of "E", and the relative distance between the first human-powered vehicle 10 of "A" and the second human-powered vehicle 10A of "C" are displayed.

The first human-powered vehicle 10 and each of the second human-powered vehicles 10A displayed in the second image can also be displayed by different types of icons. For example, as in the second image P3 illustrated in FIG. 7, the first human-powered vehicle 10 and each of the second human-powered vehicles 10A are displayed by icons of different colors. In the second image P3 illustrated in FIG. 7, differences in color are indicated by types of hatching.

The display 76 can display a change state of the positional relations between the plurality of human-powered vehicles. The change state of the positional relations between the plurality of human-powered vehicles includes first change information and second change information. The display 76 can display the first change information and the second change information. The first change information is information related to a manner of change in the positional relationship between the first human-powered vehicle 10 and the second human-powered vehicle 10A. The first change information includes information related to a direction of the change in the relative distance between the first human-powered vehicle 10 and the second human-powered vehicle 10A. The first change information is displayed by, for example, using an arrow. In a case where the relative distance between the first human-powered vehicle 10 and the second human-powered vehicle 10A increases, the direction of the arrow takes a direction away from the first human-powered vehicle 10. For example, in a case where the second human-powered vehicle 10A is traveling behind the first human-powered vehicle 10 and the relative distance between the first human-powered vehicle 10 and the second human-powered vehicle 10A increases, the direction of the arrow takes a direction facing downward. In a case where the relative distance between the first human-powered vehicle 10 and the second human-powered vehicle 10A decreases, the direction of the arrow takes a direction toward the first human-powered vehicle 10. For example, in a case where the second human-powered vehicle 10A is traveling behind the first human-powered vehicle 10 and the relative distance between the first human-powered vehicle 10 and the second human-powered vehicle 10A decreases, the direction of the arrow takes a direction facing upward.

The second change information is information related to an amount of the change in the positional relationship between the first human-powered vehicle 10 and the second human-powered vehicle 10A. The second change information includes at least one of the thickness of the arrow and the length of the arrow. For example, the arrow becomes thicker as the amount of the change in the relative distance between the first human-powered vehicle 10 and the second human-powered vehicle 10A becomes larger. For example, the arrow becomes longer as the amount of the change in the relative distance between the first human-powered vehicle 10 and the second human-powered vehicle 10A becomes larger. The controller 74 calculates values related to the first change information and the second change information in accordance with the change in the relative distance in a first predetermined time. The first predetermined time is set in advance. The first predetermined time is, for example, the same time as the predetermined interval. For example, the controller 74 calculates a difference between the current relative distance and the relative distance before the first predetermined time. The controller 74 sets the first change information and the second change information based on the calculated difference.

Figure 8:
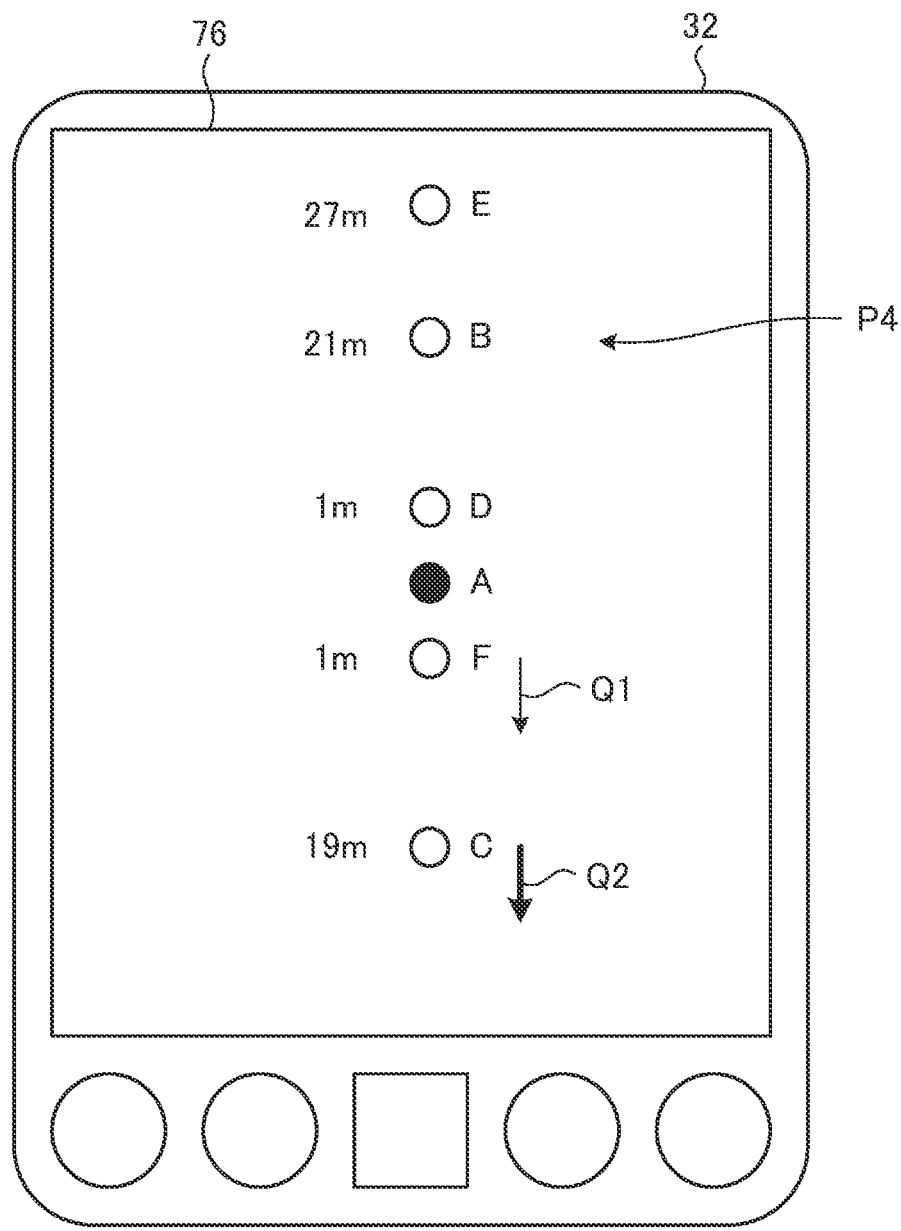
FIG. 8 is a diagram illustrating a modified example of display in the notification device according to the first embodiment.
Figure 9:
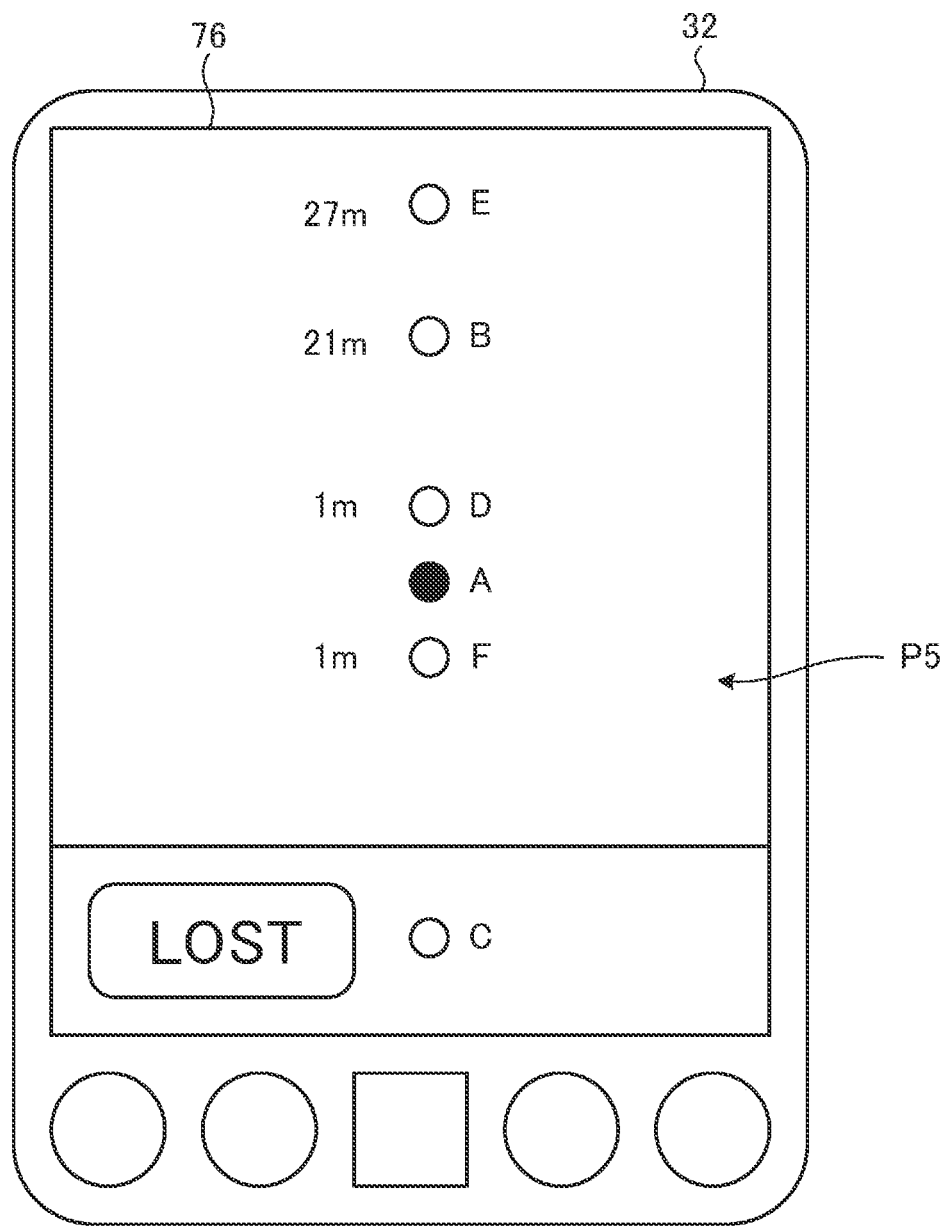
FIG. 9 is a diagram illustrating a modified example of display in the notification device according to the first embodiment.

The display 76 displays, for example, the second image P4 illustrated in FIG. 8. The second image P4 includes the first change information and the second change information. For example, in a case where the second human-powered vehicle 10A of "F" is traveling behind the first human-powered vehicle 10 of "A", and the relative distance between the first human-powered vehicle 10 of "A" and the second human-powered vehicle 10A of "F" has become longer, an arrow Q1 facing downward is displayed. In a case where the second human-powered vehicle 10A of "C" is traveling behind the first human-powered vehicle 10 of "A", and the relative distance between the first human-powered vehicle 10 of "A" and the second human-powered vehicle 10A of "C" has become longer, an arrow Q2 facing downward is displayed. For example, in a case where the amount of the change in the relative distance between the first human-powered vehicle of "A" and the second human-powered vehicle 10A of "C" is greater than the amount of the change in the relative distance between the first human-powered vehicle of "A" and the second human-powered vehicle 10A of "F", the arrow Q2 is thicker than the arrow Q1. For example, the thickness of the arrow and the length of the arrow can be classified into a plurality of stages in accordance with the relative distance. The first change information and the second change information can be displayed with symbols other than the arrow. The first change state and the second change state can be displayed with, for example, icons indicating the respective human-powered vehicles. The first change state and the second change state are displayed being distinguished from each other by the size of the icon, the color of the icon, the density of the color of the icon, the brightness of the color of the icon, and the like. The first change state and the second change state can be displayed by, for example, a display form of the relative distance. The first change state and the second change state are displayed being distinguished from each other by the magnitude of the number of the relative distance, the thickness of the number of the relative distance, the color of the number of the relative distance, the density of the color of the number of the relative distance, the brightness of the color of the number of the relative distance, and the like. The first change information and the second change information can be displayed for the set second human-powered vehicle 10A. The second human-powered vehicle 10A for which the first change information and the second change information are displayed is set via the operation unit 70, for example.

The display 76 can display lost information. The second information includes the lost information. The lost information is information indicating that the relative distance between the first human-powered vehicle 10 and the second human-powered vehicle 10A cannot be acquired. The controller 74 sets the second human-powered vehicle 10A whose relative distance with the first human-powered vehicle 10 cannot be measured, as a lost second human-powered vehicle. For example, the second human-powered vehicle 10A may be unable to perform communication by BLE because of a long relative distance between the first human-powered vehicle 10 and the second human-powered vehicle 10A is set as the lost second human-powered vehicle. For example, the second human-powered vehicle 10A unable to perform communication by BLE due to communication failure or the like is set as the lost second human-powered vehicle. In a case where the relative distance between the first human-powered vehicle 10 and the second human-powered vehicle 10A is greater than or equal to a second predetermined distance, the controller 74 can determine that the second human-powered vehicle 10A is lost. The second predetermined distance is set in advance. The second predetermined distance is greater than the first predetermined distance. The display 76 displays, for example, the second image P5 illustrated in FIG. 9. For example, in a case where the relative distance between the first human-powered vehicle 10 of "A" and the second human-powered vehicle 10A of "C" cannot be acquired, the second human-powered vehicle 10A of "C" is displayed as lost information in the second image P5.

The display 76 can display the second human-powered vehicle 10A that can be lost. For example, in a case where the rate of increase in the relative distance with the first human-powered vehicle 10 is greater than or equal to a predetermined rate of increase, the second human-powered vehicle 10A is determined to be a second human-powered vehicle that can be lost. The predetermined rate of increase is set in advance. For example, in a case where the number of times the relative distance with the first human-powered vehicle 10 becomes greater than or equal to a third predetermined distance is greater than or equal to a predetermined number of times, the second human-powered vehicle 10A is determined to be the second human-powered vehicle that can be lost. The third predetermined distance is set in advance. The third predetermined distance is shorter than the second predetermined distance. The third predetermined distance is longer than the first predetermined distance. The predetermined number of times is set in advance.

The display 76 can display, in the second image, the second information of the first human-powered vehicle 10, the second human-powered vehicle 10A at the head, and the second human-powered vehicle 10A at the tail end. The display 76 can highlight the second information of the second human-powered vehicle 10A at the head and the second human-powered vehicle 10A at the tail end. For example, the display 76 causes the second information of the second human-powered vehicle 10A at the head and the second human-powered vehicle 10A at the tail end to blink in the second image.

The second information can be notified by using at least one of a sound and a vibration. The second information is notified by the notification unit 78, for example. The notification unit 78 notifies the second information by using at least one of the sound and the vibration. For example, the notification unit 78 notifies the lost information by using at least one of the sound and the vibration.

In step S14, the controller 74 transmits the second signal to the display 76 and then proceeds to step S15. In step S15, the controller 74 counts a display time. The display time is a time during which the second image is displayed on the display 76. After transmitting the second signal to the display 76, the controller 74 starts counting the display time. The controller 74 continues to count the display time until the display time reaches a second predetermined time. The second predetermined time is set in advance. The second predetermined time can be set, for example, by operation of the operation unit 70. The controller 74, after counting the display time in step S15, proceeds to step S16.

In step S16, the controller 74 determines whether the display time has reached the second predetermined time. In a case where it is determined that the display time has not reached the second predetermined time, the controller 74 proceeds to step S15. In a case where it is determined that the display time has reached the second predetermined time, the controller 74 proceeds to step S17. In the case where it is determined that the display time has reached the second predetermined time, the display time is reset.

In step S17, the controller 74 generates the first signal. The controller 74, after generating the first signal in step S17, proceeds to step S18.

In step S18, the controller 74 transmits the first signal to the display 76. With this, the first image is displayed on the display 76. The first image is displayed on the display 76 instead of the second image. The image displayed on the display 76 is switched from the second image to the first image. The display 76 displays the first information. After displaying the second information for the second predetermined time, the display 76 ends the display of the second information. The switching from the second image to the first image can be notified by the notification unit 78. In a case where the image displayed on the display 76 is switched from the second image to the first image, the notification unit 78 notifies the rider of the switching from the second image to the first image by using at least one of the sound and the vibration, for example.

After the second image is displayed on the display 76, the controller 74 can switch the display on the display 76 from the second image to the first image based on an input from the operation unit 70 operated by the rider.

Second Embodiment

In a second embodiment, the notification device 32 for the human-powered vehicle 10 will be described below. Description of the same configuration and control as those of the notification device 32 according to the first embodiment will be omitted. A control flow of the notification device 32 according to the second embodiment is different from that of the first embodiment. The notification device 32 displays the first information or second information on the display 76 by executing the control flow illustrated in FIG. 10.

Figure 10:
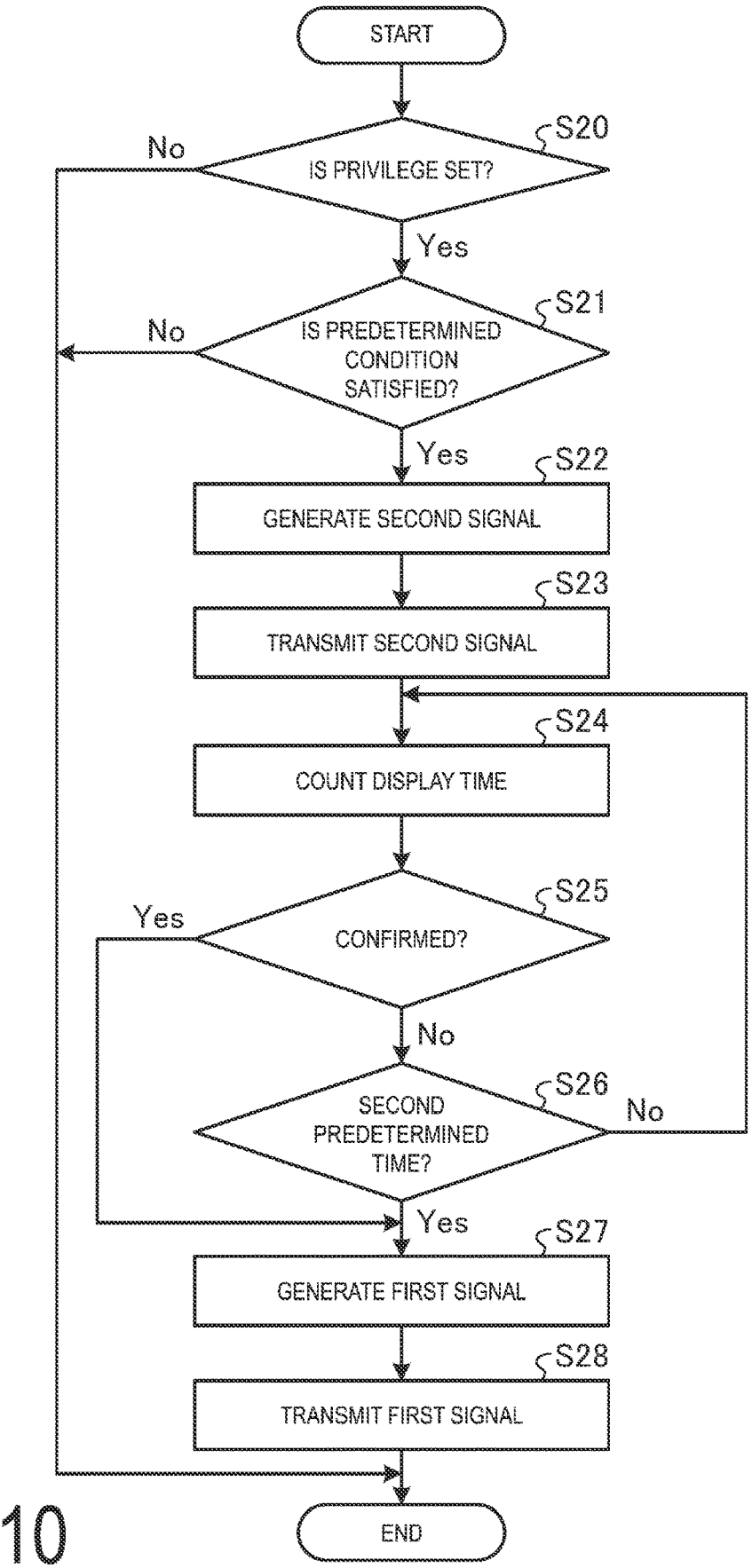
FIG. 10 is a flowchart illustrating an example of a control flow for controlling display of a display in a notification device according to a second embodiment.

Processing of step S20 and processing of step S21 in FIG. 10 are the same as those of step S10 and step S11 in FIG. 4. In a case where it is determined in step S21 that the predetermined condition is satisfied, the controller 74 proceeds to step S22.

Pieces of processing from step S22 to step S24 in FIG. 10 are the same as those from step S13 to step S15 in FIG. 4. For example, in step S23, the controller 74 transmits the second signal to the display 76. Thus, the second information is displayed on the display 76. In a case where the positional relationship between the first human-powered vehicle 10 and the second human-powered vehicle 10A satisfies the predetermined condition, the display 76 displays the second information. Specifically, in a case where the relative distance between the first human-powered vehicle 10 and the second human-powered vehicle 10A is greater than or equal to the first predetermined distance, the display 76 displays the second information. In a case where the positional relationship between the first human-powered vehicle and the second human-powered vehicle 10A satisfies the predetermined condition, the display displays the second information while the first information is being displayed. The display 76 displays the second information in a case where the predetermined condition is satisfied while the first information being displayed. The controller 74, after counting the display time in step S24, proceeds to step S25.

In step S25, the controller 74 determines whether the second image has been confirmed by the rider. The controller 74 determines whether a display end operation of the second image has been performed. For example, in a case where the rider has performed the display end operation of the second image with the operation unit 70, the controller 74 determines that the second image has been confirmed by the rider. In a case where the rider does not perform the display end operation of the second image with the operation unit 70, the controller 74 determines that the second image has not been confirmed by the rider. In a case where it is determined that the second image has been confirmed by the rider, the controller 74 proceeds to step S27. In a case where it is determined that the second image has not been confirmed by the rider, the controller 74 proceeds to step S26.

Pieces of processing from step S26 to step S28 in FIG. 10 are the same as those from step S16 to step S18 in FIG. 4. In a case where it is determined in step S26 that the display time has not reached the second predetermined time, the controller 74 proceeds to step S24. The display 76 performs switching between the first information and the second information based on the input related to the movement of the rider of the first human-powered vehicle 10. To be specific, in a case where it is determined in step S25 that the second image has been confirmed by the rider, the controller 74 performs the processing in step S27 and then transmits the first signal to the display 76 in step S28. With this, the image displayed on the display 76 is switched from the second image to the first image. The display 76 displays the first information.

Even in a case where the second image is not confirmed by the rider after the second image is displayed on the display 76, the notification device 32 ends the display of the second image in a case where the display time of the second image reaches the second predetermined time.

Third Embodiment

In a third embodiment, the notification device 32 for the human-powered vehicle 10 will be described below. Description of the same configuration and control as those of the notification device 32 according to the first embodiment will be omitted. A control flow of the notification device 32 according to the third embodiment is different from that of the first embodiment. The notification device 32 displays the first information or second information on the display 76 by executing the control flow illustrated in FIG. 11. In a case where the privilege is set, the notification device 32 according to the third embodiment displays the second image on the display 76 without determining whether the predetermined condition of the first embodiment is satisfied. The display 76 displays the second information in a case where the privilege is set. In a case where the predetermined interval has elapsed, the display 76 displays the second information. The information related to the positional relationship between the first human-powered vehicle 10 and the second human-powered vehicle 10A is displayed based on a timing at which the relative distance between the first human-powered vehicle 10 and the second human-powered vehicle 10A is measured.

Figure 11:
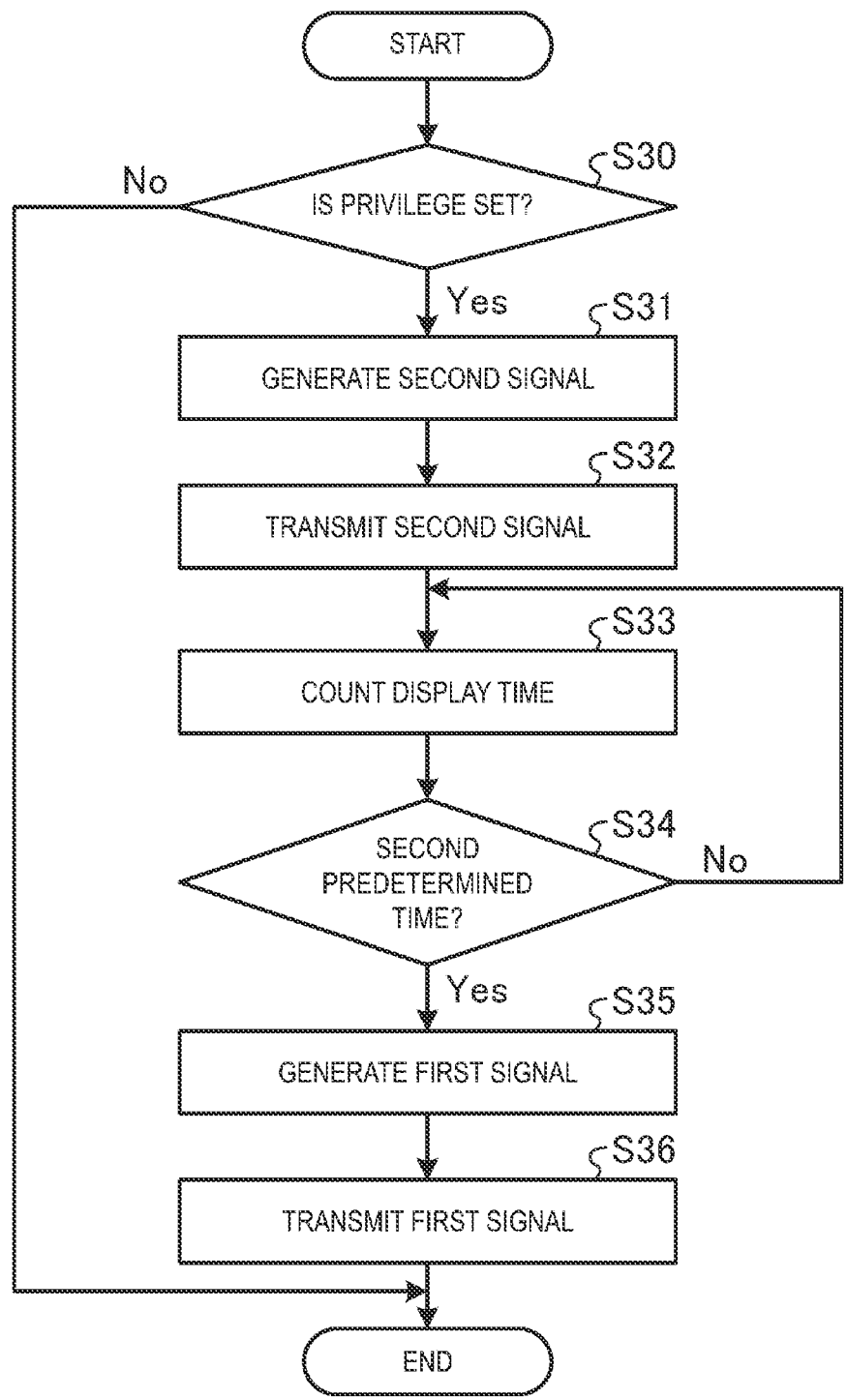
FIG. 11 is a flowchart illustrating an example of a control flow for controlling display of a display in a notification device according to a third embodiment.

Processing in step S30 in FIG. 11 is the same as the processing in step S10 in FIG. 4. Pieces of processing from step S31 to step S36 in FIG. 11 are the same as those from step S13 to step S18 in FIG. 4. In a case where it is determined in step S34 that the display time has not reached the second predetermined time, the controller 74 proceeds to step S33.

In the notification device 32 according to a modified example, the display 76 can perform switching between the first information and the second information based on an input from a detection unit configured to detect a gaze change of the rider. The detection unit configured to detect the gaze change of the rider is, for example, a wearable camera. For example, in step S12 of FIG. 4, the controller 74 can determine whether there is a display operation of the second image in accordance with the gaze change of the rider. The controller 74 acquires a signal related to the gaze change of the rider detected by the wearable camera. For example, in a case where the gaze change of the rider is a gaze change for looking at the display 76, the controller 74 determines that there is a display operation of the second image. In a case where the gaze change of the rider is a gaze change not for looking at the display 76, the controller 74 determines that there is no display operation of the second image. For example, in step S25 of FIG. 10, the controller 74 can determine whether the second image has been confirmed in accordance with the gaze change of the rider. For example, in a case where the gaze change of the rider is a gaze change for looking at the display 76, the controller 74 determines that the second image has been confirmed. In a case where the gaze change of the rider is a gaze change not for looking at the display 76, the controller 74 determines that the second image has not been confirmed yet.

Figure 12:
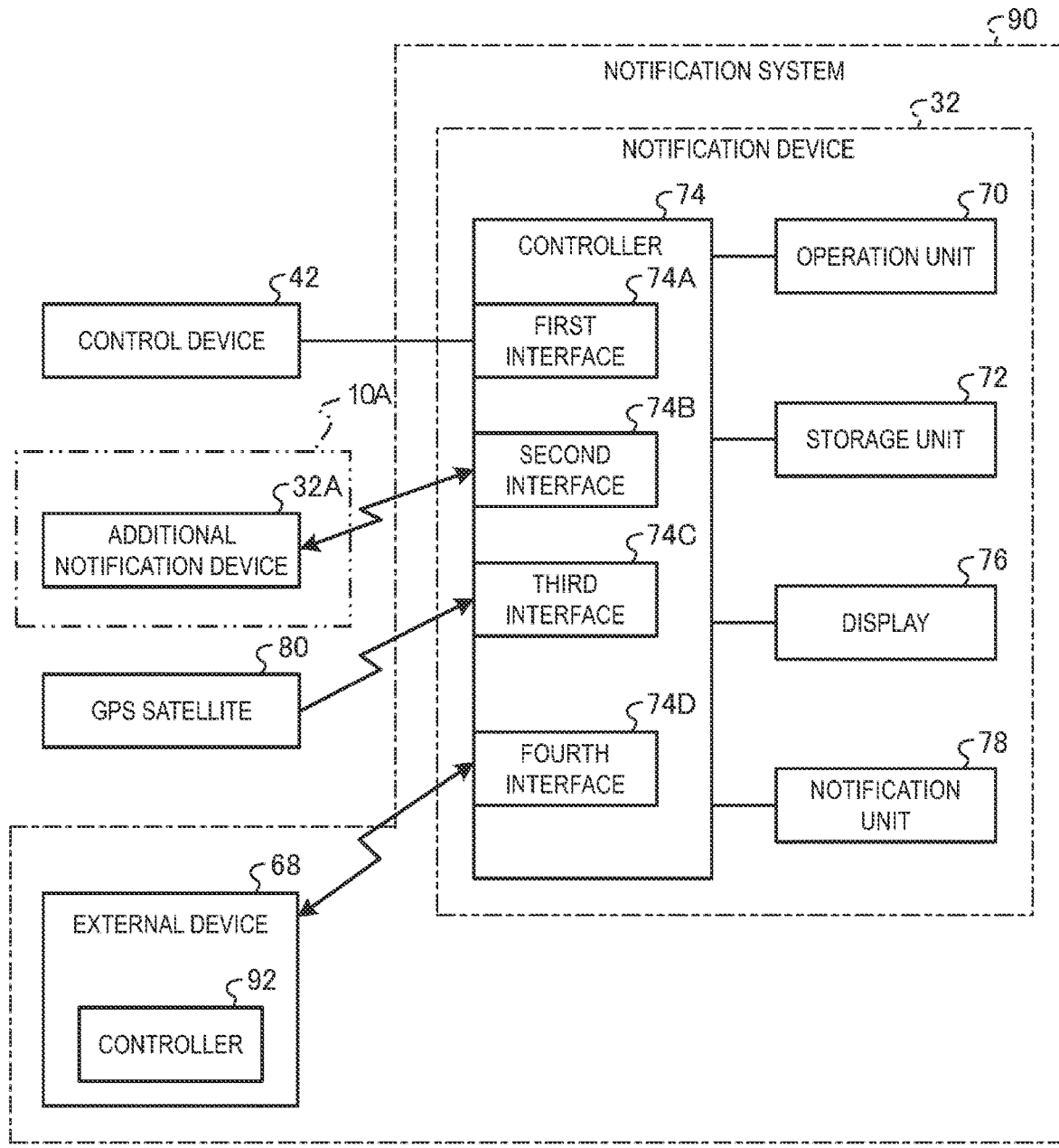
FIG. 12 is a block diagram illustrating an electrical configuration of a notification system according to a modified example.

As illustrated in FIG. 12, a notification system 90 is illustrated according to a first modification. The notification system 90 includes the notification device 32 and the external device 68. In the notification system 90, the privilege can be set by the external device 68. The notification system 90 includes a controller 92, which is also referred to as an external controller. The controller 92 sets the privilege. For example, the controller 92 is provided to the external device 68. The controller 92 is formed of one or more semiconductor chips that are mounted on a circuit board. The controller 92 can also be referred to as an electronic controller. The controller 92 includes an arithmetic device such as a CPU or an MPU. The controller 92 can include a plurality of arithmetic devices. The plurality of arithmetic devices can be provided to positions separated from each other. The controller 92 is configured to comprehensively control at least part of operations of the notification system 90, for example, by the arithmetic device executing a program stored in a ROM while using a RAM as a work area. For example, a non-transitory computer-readable medium encoded with the program to be executed by a computer (the external device 68) to function as the notification system 90. The controller 92 sets the privilege based on operation by the user. The external device 68 transmits the information related to the privilege to the notification device 32 via a wireless communication device. The notification device 32 receives the information related to the privilege transmitted from the external device 68. The received information related to the privilege is stored in the storage unit 72. For example, the privilege is set by using an application installed in the external device 68 such as a smartphone, a tablet, a computer, etc. The information related to the privilege set by using the application can be transmitted to the notification device 32 via the wireless communication device.

The positional relationship between the plurality of human-powered vehicles can be measured based on position information of each of the plurality of human-powered vehicles. The positional relationship between the first human-powered vehicle 10 and the second human-powered vehicle 10A can be measured based on the position information of the first human-powered vehicle and the position information of the second human-powered vehicle 10A. For example, the position information of the first human-powered vehicle 10 and the position information of the second human-powered vehicle 10A are detected based on information transmitted from the GPS satellite 80. The positional relationship between the first human-powered vehicle 10 and the second human-powered vehicle 10A is measured by, for example, the notification device 32. The notification device 32 acquires the position information of the second human-powered vehicle 10A from the additional notification device 32A, for example. The notification device 32 can acquire the position information of the second human-powered vehicle 10A via the external device 68. The notification device 32 measures the positional relationship between the first human-powered vehicle 10 and the second human-powered vehicle 10A based on the acquired position information of the second human-powered vehicle 10A and the position information of the first human-powered vehicle 10. For example, the notification device 32 measures the relative distance between the first human-powered vehicle 10 and the second human-powered vehicle 10A based on the position information of the second human-powered vehicle 10A and the position information of the first human-powered vehicle 10. The positional relationship between the first human-powered vehicle 10 and the second human-powered vehicle 10A can be measured by, for example, the external device 68. The external device 68 acquires the position information of the first human-powered vehicle 10 from the notification device 32 and the position information of the second human-powered vehicle 10A from the additional notification device 32A. The external device 68 measures the positional relationship between the first human-powered vehicle 10 and the second human-powered vehicle 10A based on each of the acquired position information. For example, the external device 68 measures the relative distance between the first human-powered vehicle 10 and the second human-powered vehicle 10A based on the position information of the second human-powered vehicle 10A and the position information of the first human-powered vehicle 10. The external device 68 transmits the information related to the positional relationship between the first human-powered vehicle 10 and the second human-powered vehicle 10A to the notification device 32. The notification device 32 receives the information related to the positional relationship between the first human-powered vehicle 10 and the second human-powered vehicle 10A.

In the control device 42 of the embodiments, of the first interface 52A to the sixth interface 52F, the interface unnecessary for control can be omitted. In the notification device 32 of the embodiments, of the first interface 74A to the fourth interface 74D, the interface unnecessary for control can be omitted.

The phrase "at least one" as used in this description means "one or more" of desired options. As one example, in a case where the number of options is two, the phrase "at least one" as used in this description means "only one option" or "both of the two options". As another example, in a case where the number of options is three or more, the phrase "at least one" as used in this description means "only one option" or "any combination of two or more options".

What is claimed is:

1. A notification device comprising:
a display configured to selectively display first information related to a traveling state of a first human-powered vehicle and second information related to a positional relationship between the first human-powered vehicle and a second human-powered vehicle that is different from the first human-powered; and a controller configured to control the display to display the second information in a case where the positional relationship between the first human-powered vehicle and the second human-powered vehicle satisfies a predetermined condition.

2. The notification device according to claim 1, wherein the controller is further configured to control the display to display the second information in a case where the predetermined condition is satisfied while the first information is being displayed.

3. The notification device according to claim 1, wherein the controller is further configured to control the display to display the second information in a case where a relative distance between the first human-powered vehicle and the second human-powered vehicle is equal to or more than a predetermined distance.

4. The notification device according to claim 1, wherein the second information includes lost information indicating that a relative distance between the first human-powered vehicle and the second human-powered vehicle cannot be acquired.

5. The notification device according to claim 1, wherein the controller is further configured to control the display to switch between the first information and the second information based on an input related to a movement of a rider of the first human-powered vehicle.

6. The notification device according to claim 5, wherein the controller is further configured to control the display to switch between the first information and the second information based on an input from an operation unit operated by the rider.

7. The notification device according to claim 5, wherein the controller is further configured to control the display to switch between the first information and the second information based on an input from a detection unit configured to detect a gaze change of the rider.

8. A notification device comprising:
a display configured to display information related to a positional relationship between a first human-powered vehicle and a second human-powered vehicle that is different from the first human-powered vehicle; and
a controller configured to control the display to display first change information related to a manner of change in the positional relationship and second change information related to an amount of the change in the positional relationship.

9. The notification device according to claim 8, wherein the first change information is indicated by using an arrow.

10. The notification device according to claim 9, wherein the second change information includes at least one of a thickness of the arrow and a length of the arrow.

11. The notification device according to claim 1, wherein the notification device is configured to be attachable to a human-powered vehicle.

12. The notification device according to claim 1, wherein the information related to the positional relationship is displayed based on a timing at which a relative distance between the first human-powered vehicle and the second human-powered vehicle is measured.

13. The notification device according to claim 1, wherein the controller is further configured to control the display to display the information related to the positional relationship for a predetermined time interval, and then to end displaying of the information related to the positional relationship.

14. The notification device according to claim 1, further comprising:
a notification unit configured to execute notification of the information related to the positional relationship by using at least one of a sound and a vibration.

15. The notification device according to claim 1, wherein the positional relationship is measured by using wireless communication between the first human-powered vehicle and the second human-powered vehicle.

16. The notification device according to claim 15, wherein the wireless communication includes a Bluetooth-Low-Energy communication.

17. The notification device according to claim 1, wherein the positional relationship is measured based on position information of the first human-powered vehicle and position information of the second human-powered vehicle.

18. A non-transitory computer-readable medium encoded with a program to be executed by a computer to function as: the notification device according to claim 1.

\* \* \* \* \*